(12) United States Patent
Lutz et al.

(10) Patent No.: US 6,915,910 B2
(45) Date of Patent: Jul. 12, 2005

(54) SCREEN CYLINDER AND METHOD

(75) Inventors: Mark S. Lutz, West Allis, WI (US); Tim J. Cromell, Waukesha, WI (US)

(73) Assignee: J&L Fiber Services, Inc., Waukesha, WI (US)

( * ) Notice: Subject to any disclaimer, the term of this patent is extended or adjusted under 35 U.S.C. 154(b) by 173 days.

(21) Appl. No.: 10/124,563

(22) Filed: Apr. 16, 2002

(65) Prior Publication Data

US 2002/0148763 A1 Oct. 17, 2002

Related U.S. Application Data

(60) Provisional application No. 60/283,963, filed on Apr. 16, 2001.

(51) Int. Cl.$^7$ .............................................. B01D 29/44
(52) U.S. Cl. .................. 210/485; 210/489; 210/497.01; 210/498; 210/499; 209/395
(58) Field of Search ................................. 210/415, 484, 210/485, 488, 489, 497.01, 498, 499; 209/395

(56) References Cited

U.S. PATENT DOCUMENTS

| | | |
|---|---|---|
| 1,040,342 A | 10/1912 | Johnson |
| 1,561,632 A | 11/1925 | Woodward |
| 1,855,904 A | 4/1932 | Brown et al. |
| 1,930,128 A | 10/1933 | Lund |
| 2,055,251 A | 9/1936 | Duvall |
| 2,134,703 A | 11/1938 | Cobb |
| 2,204,928 A | 6/1940 | Culver |
| 2,259,235 A | 10/1941 | Weiss |
| 2,306,074 A | 12/1942 | Meyer |
| 2,321,207 A | 6/1943 | Howe |
| 2,342,913 A | 2/1944 | Williams et al. |
| 2,352,340 A | 6/1944 | Oswald |
| 2,534,161 A | 12/1950 | Collins |
| 2,567,266 A | 9/1951 | Young |
| 2,639,035 A | 5/1953 | Pearlstein |
| 2,682,205 A | 6/1954 | Vincent |
| 2,710,693 A | 6/1955 | Manley et al. |
| 2,724,507 A | 11/1955 | Cataldo |

(Continued)

FOREIGN PATENT DOCUMENTS

| | | |
|---|---|---|
| CA | 2049279 | 2/1997 |
| DE | 449430 | 9/1927 |
| DE | 557413 | 8/1932 |

(Continued)

OTHER PUBLICATIONS

Beloit Corporation Hi–Q Fibresaver Model 2100 Screen Cylinder Weldment Perforated Screen Design drawing page, undated.

(Continued)

Primary Examiner—Matthew O. Savage
(74) Attorney, Agent, or Firm—Boyle, Fredrickson, Newholm, Stein & Gratz, S.C.

(57) ABSTRACT

A pulp screen cylinder that includes screen media releasably engaged with a frame at spaced locations opposing movement of the media away from the frame during screening. A preferred frame includes a plurality of spaced engaging structures that releasably engage screen media. A preferred frame includes an arrangement of flow windows that are triangular or rhomboid. A preferred method includes producing a frame cylinder by centrifugal casting and machining flow windows using a jet cutting process. A preferred screen media has a plurality of spaced apart engaging structures that each releasably engages the frame at spaced apart locations. A preferred screen media is of wedgewire construction having engaging structure carried by a plurality of spaced wire retaining clips. A preferred clip has vee-shaped rounded slots and an arm thicker than an end wall. A preferred engaging structure includes a projection that has a lip or hook for releasable interlocking engagement.

32 Claims, 21 Drawing Sheets

U.S. PATENT DOCUMENTS

| | | |
|---|---|---|
| 2,768,751 A | 10/1956 | Booth |
| 2,850,165 A | 9/1958 | Hesse et al. |
| 2,910,183 A | 10/1959 | Hayes |
| 3,044,167 A | 7/1962 | Mathieu |
| 3,461,531 A | 8/1969 | DeGain |
| 3,520,418 A | 7/1970 | Guinard |
| 3,631,981 A | 1/1972 | Young |
| 3,680,696 A | 8/1972 | Morin |
| 3,716,144 A | 2/1973 | Bartlow |
| 3,773,614 A | 11/1973 | Pennington |
| 3,807,202 A | 4/1974 | Gunkel |
| 3,901,801 A | 8/1975 | Bixby ........................ 209/395 |
| D239,837 S | 5/1976 | Pinder et al. |
| 4,068,713 A | 1/1978 | McGuire |
| 4,200,537 A | 4/1980 | Lamort |
| 4,259,136 A | 3/1981 | Spiewok |
| 4,264,438 A | 4/1981 | Frejborg |
| 4,276,265 A | 6/1981 | Gillespie |
| 4,284,500 A | 8/1981 | Keck |
| 4,343,700 A | 8/1982 | Daubman et al. |
| 4,410,424 A | 10/1983 | Chupka et al. |
| 4,430,221 A | 2/1984 | Spiewok |
| 4,494,603 A | 1/1985 | Harguindey |
| 4,569,761 A | 2/1986 | Spiewok et al. |
| 4,657,079 A | 4/1987 | Nagaoka |
| 4,697,060 A | 9/1987 | Izuwa et al. |
| 4,828,689 A | 5/1989 | Lamort |
| 4,909,929 A | 3/1990 | Tabor |
| 4,918,807 A | 4/1990 | Frejborg |
| 4,932,112 A | 6/1990 | Tikkanen |
| 4,944,874 A | 7/1990 | Kobayashi et al. |
| 4,954,249 A | 9/1990 | Gero et al. |
| 4,986,900 A | 1/1991 | Mason |
| 5,009,795 A | 4/1991 | Eichler |
| 5,011,065 A | 4/1991 | Musselmann |
| 5,023,986 A | 6/1991 | Gero et al. |
| 5,041,212 A | 8/1991 | Gero et al. |
| 5,041,214 A | 8/1991 | Gero et al. |
| 5,049,262 A | 9/1991 | Galton |
| 5,064,537 A * | 11/1991 | Chupka et al. ........ 210/497.01 |
| 5,069,279 A | 12/1991 | Nagaoka |
| 5,090,721 A | 2/1992 | Lange |
| 5,091,084 A | 2/1992 | Krettek |
| 5,094,360 A | 3/1992 | Lange |
| 5,139,154 A | 8/1992 | Gero et al. |
| 5,200,072 A | 4/1993 | Frejborg et al. |
| 5,237,154 A | 8/1993 | Pellhammer et al. |
| 5,368,169 A | 11/1994 | Ensor |
| 5,417,858 A | 5/1995 | Derrick et al. |
| 5,513,757 A | 5/1996 | Papetti |
| 5,587,077 A * | 12/1996 | Aaltonen et al. ........... 210/498 |
| D377,656 S | 1/1997 | Leone et al. |
| 5,595,307 A | 1/1997 | Hautala |
| 5,647,128 A | 7/1997 | Aikawa |
| 5,718,826 A | 2/1998 | Freborg |
| 5,727,316 A | 3/1998 | Riendeau |
| 5,755,334 A | 5/1998 | Wojcik et al. |
| 5,791,495 A | 8/1998 | Gero et al. |
| 5,944,993 A | 8/1999 | Derrick et al. |
| 5,954,956 A | 9/1999 | Lutz et al. |
| 5,968,357 A | 10/1999 | Doelle et al. |
| 5,971,160 A | 10/1999 | Abdulmassih et al. |
| 6,021,905 A | 2/2000 | Frejborg |
| 6,051,103 A | 4/2000 | Aikawa |
| 6,056,126 A | 5/2000 | Schabel et al. |
| 6,131,743 A | 10/2000 | Czerwoniak et al. |
| 6,138,838 A | 10/2000 | Soik et al. |
| 6,283,302 B1 | 9/2001 | Schulte et al. |
| D456,825 S | 5/2002 | Lutz et al. |
| D458,618 S | 6/2002 | Lutz et al. |
| 6,491,168 B1 | 12/2002 | Lutz et al. |
| 6,579,458 B2 * | 6/2003 | Mickelat et al. ......... 210/360.1 |
| 2001/0017274 A1 | 8/2001 | Gabl et al. |
| 2001/0019025 A1 | 9/2001 | Gabl et al. |
| 2001/0020600 A1 | 9/2001 | Gabl et al. |
| 2001/0022284 A1 | 9/2001 | Gabl et al. |
| 2001/0045379 A1 | 11/2001 | Gabl et al. |

FOREIGN PATENT DOCUMENTS

| | | |
|---|---|---|
| DE | 628 980 | 5/1936 |
| EP | 0 471 195 A1 | 2/1992 |
| EP | 0 521 192 A1 | 1/1993 |
| FI | 80737 B | 3/1990 |
| FR | 2442647 | 10/1978 |
| GB | 293668 | 7/1928 |
| IT | 628633 | 11/1961 |
| JP | 34-11353 | 7/1959 |
| JP | 57-187011 | 11/1982 |
| JP | 60-104212 | 7/1985 |
| SU | 316803 | 6/1972 |
| WO | WO 87/04474 | 7/1987 |

OTHER PUBLICATIONS

Fiedler Drilled and Milled Sheets product brochure, undated.

Voith Sulzer Slot Screening Eco Bar informational sheet, 3/95.

Black Clawson Selectifier Screens for Paper and Pulp Mills product brochure, undated.

J & L Fiber Services BelWave Screen Cylinder product brochure, undated.

USP Drilled, Slotted and Perforated products brochure, undated.

Johnson Screens, U.S. Filter Collectors/Distributors brochure, 4/96.

CAE ScreenPlates, Durashell™ Cage Design informational sheets.

Fiedler, CON–Screen™ informational sheets.

Fiedler, HF Bar–Screen informational sheets, 3/99.

*Pima Magazine*, "Conically drilled plates produce more effective screening area," Mar. 1979, vol. 61, No. 3, pp. 30–32.

Johnson® screens, reactor internals informational sheet, 1975.

Johnson® screens, "Reactor Screen Internals" catalog, Mar. 1973.

1984 Pulping Conference, "New Wave Screen Baskets Upgrade Existing Systems," pp. 515–520.

\* cited by examiner

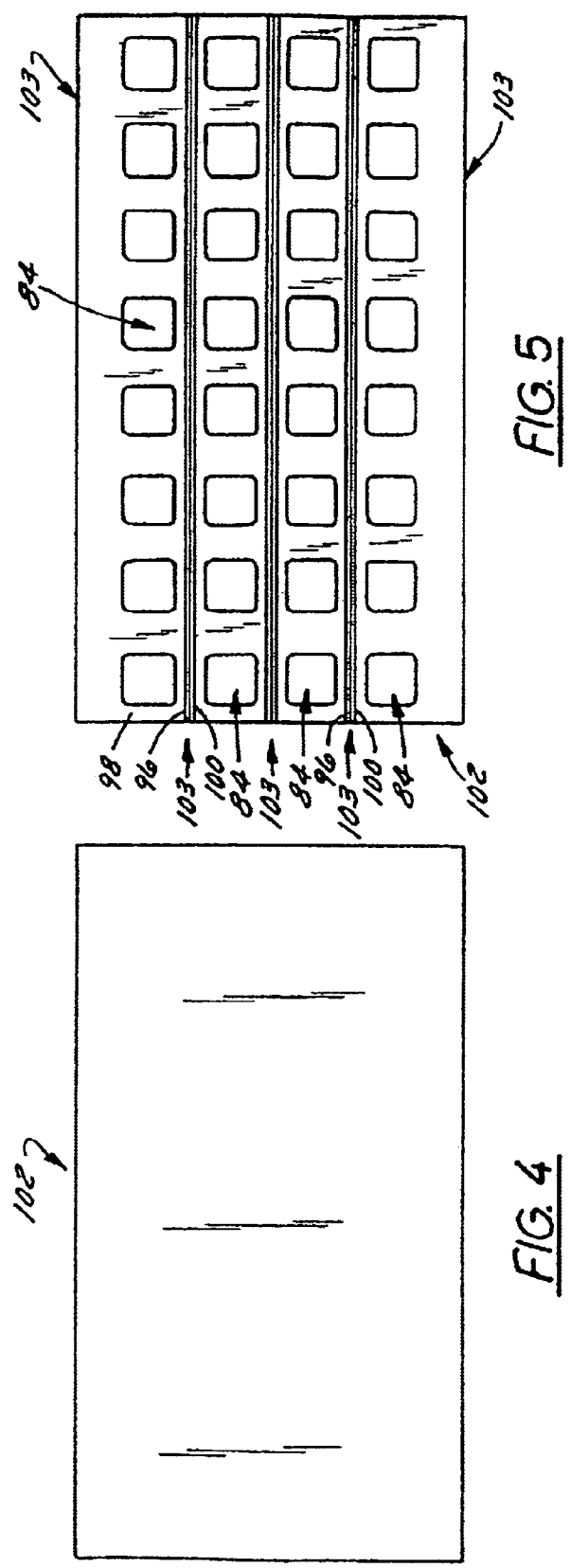

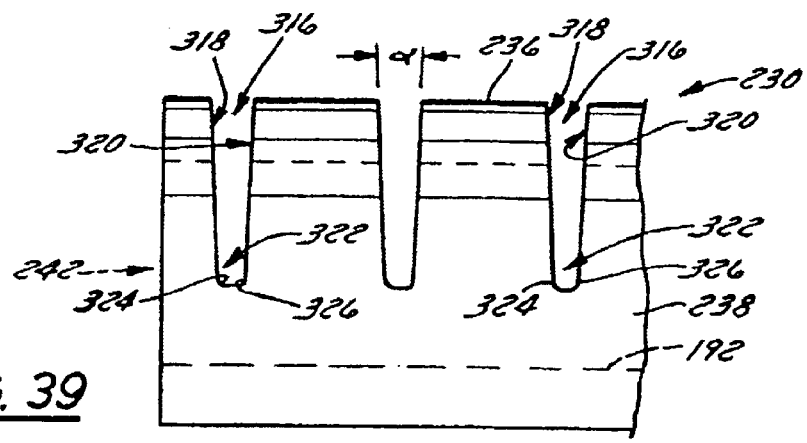
FIG. 39
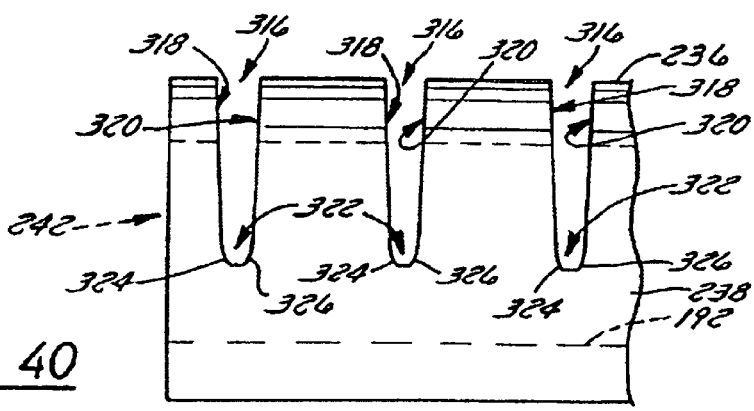
FIG. 40
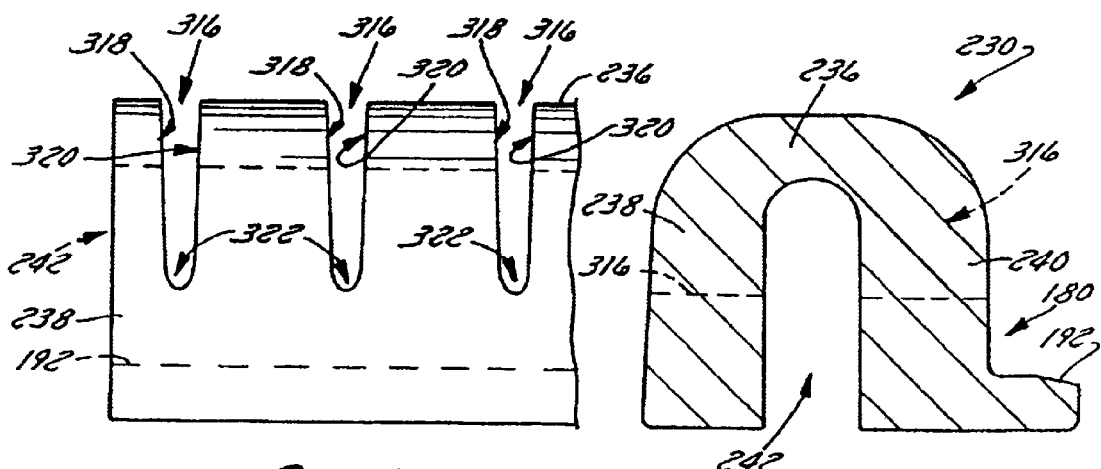
FIG. 41
FIG. 42

SCREEN CYLINDER AND METHOD

CROSS REFERENCE TO RELATED APPLICATION

This application claims priority under 35 U.S.C. §119(e) to U.S. Provisional Patent Application No. 60/283,963, filed Apr. 16, 2001, the entirety of which is incorporated by reference herein.

FIELD OF THE INVENTION

The present invention relates generally to generally screens for use in pulp screening or filtering and more particularly to a pulp screen cylinder that includes perforate screen media supported by a perforate frame and a method of making and assembling the same.

BACKGROUND OF THE INVENTION

Screen cylinders have long been used in pulp and papermaking applications to screen fiber in a stock slurry. Screen cylinders typically consist of a perforate cylinder received in the housing of a screening apparatus. Stock flows through slots or holes in the sidewall of the screen cylinder where it eventually ends up being processed into pulp, paper or another fiber product. Fiber in the stock selectively passes through the slots or holes in an accepts side of the screen cylinder and exits out a discharge side of the screen cylinder.

In the past, attempts have been made to provide a screen cylinder that included a replaceable perforate screen media supported by a frame. One such attempt is disclosed in U.S. Pat. No. 5,200,072. The '072 patent discloses a screen cylinder having a perforate backing plate that is heat shrink fit over a perforate screening plate. One problem with the screen cylinder disclosed in this patent is that it requires heating up the backing plate to expand it so that the screening plate can be inserted or removed. This is time consuming, labor intensive, and, as a result, costly.

Another problem with this arrangement is that the screen plate is prone to premature failure during operation because rotation of a foil of a rotor of the screening apparatus disposed inside the screen cylinder tends to pull the screen plate away from the backing plate adjacent the foil as it rotates. Since the backing plate does not engage the screen plate in a manner that restrains radial movement of the screen plate away from the backing plate, the screen plate deflects radially away from the backing plate each time the rotor foil rotates. As a result, repeated stress cycling of the screen plate created by negative pressure pulses that follow the rotor foil can cause the screen plate to crack and prematurely fail.

Additionally, because the backing plate does not provide radial support to the screen plate in both radial directions, the stress experienced by the screen plate is not uniform. This creates stress concentrations in the screen plate as a result of the screen plate being pulled away from the backing plate that also can prematurely accelerate failure. As a result of these deficiencies, this arrangement is believed to be limited to lower consistency screening applications. These deficiencies also limit the size and thickness of the screen plate and backing plate, which in turn prevents its application to pulp screening apparatuses having tight packaging requirements.

Wedgewire screen media have been used in pulp screening applications for many years. While wedgewire screen cylinders are cheaper to make than conventional screen cylinders, they tend to fail sooner because they are not as strong. One solution in the past has been to weld reinforcement rings to clips that retain the wires of the wedgewire screen media to increase strength. While this has worked to a limited degree, the weld that attaches each ring to the retainer clip creates a heat-affected zone in part of the clip. This heat-affected zone makes the clip more brittle and less able to withstand the repeated stress cycling that all screen cylinders typically encounter. As a result, wedgewire screen media can prematurely fail.

Another problem with wedgewire screen media is that the wire receiving slots in the retainer clips that hold the screening wires tend to be locations where cracks are more likely to form. These slots have end walls with corners that are relatively sharp, creating undesirable stress risers. As a result, cracks are more likely to form in the slots at the corners. Once formed, they are likely to quickly propagate through the clip causing screen media failure. Once formed, these cracks also tend to propagate through reinforcing rings, which then renders such rings less effective.

What is needed is a screen cylinder assembly that uses a frame and a replaceable screen media that can be of wedgewire construction that is longer lasting and more reliable. What is also needed is a frame and wedgewire screen media of improved construction.

SUMMARY OF THE INVENTION

The present invention is directed to a screen cylinder assembly that includes a perforate frame and replaceable perforate screen media that preferably is of wedgewire construction. The frame and screen media releasably engage in a manner that provides support to the screen media to oppose movement of at least part of the screen media away from the frame. The frame also supports the screen media such that movement or deflection of at least part of the screen media toward the frame is opposed by the frame. A preferred releasable engagement arrangement releasably interlocks the screen media and the frame at spaced locations.

The frame has a sidewall of a solid material, such as a sheet of metal or the like, that is of perforate construction to permit flow of stock therethrough. In one preferred embodiment, the frame has triangularly shaped flow windows that enable the frame to be constructed with increased flow area that preferably encompasses at least 50% of total frame surface area while still being strong, tough, and resistant to stress cycling. One preferred arrangement of triangularly shaped flow windows provides struts between adjacent windows in a hexagonal truss arrangement. One preferred frame has a plurality of hexagonal trusses disposed about its circumference to provide increased strength while maximizing flow area. Another arrangement disposes windows in lines with their apexes facing in opposite directions.

In another preferred frame arrangement, the frame has diamond-shaped flow windows. One arrangement includes flow windows disposed in rows and columns such that a set of aligned windows from one section of the frame form a Chevron with a set of aligned windows of another section of the frame. Another arrangement staggers windows such that they partially overlap along one direction.

In one preferred embodiment, the frame is equipped with a plurality of spaced apart screen media engaging structures that releasably interlock with screening media so as to support the screening media at spaced locations so as to oppose screen media movement toward and away from the frame. In a preferred embodiment, each screen media engaging structure includes a plurality of spaced projections that engage the screen media. In one preferred embodiment, the projection includes a lip that releasably interlocks with the screen media. An engagement structure can include a plurality of lips.

A preferred frame embodiment includes a plurality of channels in a peripheral surface that each define a lip that engages with the screen media to releasably interlock the screen media to the frame. Preferably, the lip extends generally parallel with the frame. In one preferred embodiment, a plurality of lips is spaced apart and extends circumferentially about the frame.

In one preferred frame embodiment, the frame is made from a centrifugally cast cylindrical blank. Flow windows are formed in the sidewall of the blank by a liquid jet cutting process. Engagement structure is formed preferably by machining. Buffing and polishing of the frame can be performed.

The screen media preferably includes a plurality of spaced apart engagement structures that releasably engage the frame in a manner that opposes movement or deflection of at least a plurality of portions of the screen media away from the frame. The frame supports the screen media such that movement or deflection of at least a plurality of portions of the screen media toward the frame is opposed.

In one preferred screen media embodiment, each engagement structure includes a projection that releasably interlocks with the frame. The projection preferably includes a lip. In one preferred embodiment, the lip extends about a periphery of the screen media. Where the screen media is cylindrical, the lip extends about a circumference of the screen media in a preferred embodiment. An engagement structure can include a plurality of lips.

The screen media can be of wedgewire construction. Where a wedgewire screen media is constructed to releasably interlock with a frame, the wedgewire screen media is constructed with a plurality of spaced apart engaging structures that preferably are axially spaced apart. One preferred wedgewire screen media embodiment has a plurality of spaced apart wire retainer clips that each have a projection that releasably interlocks with the frame. In one preferred embodiment, wires retained by the clips extend axially and define screening slots therebetween, clips are spaced apart axially, and each projection that engages the frame does so at axially spaced apart locations. In one preferred clip embodiment, the clip has a body defined by an end wall and an arm that carries a frame engaging structure.

In one preferred embodiment, each one of the plurality of clips equipped with engaging structures has a projection that includes a hook the releasably interlocks with a lip carried by the frame. In one preferred embodiment, a plurality of spaced apart lips is integrally formed in a sidewall of the frame. End rings or covers can be provided that attach to the frame and bear against an end or edge of screen media to oppose relative sliding movement of screen media relative to the frame. One or both rings or covers preferably are removably attached to the frame.

In one preferred wedgewire screen media construction, a retainer clip is provided that has wire-receiving slots with rounded corners to minimize stress and reduce clip cracking. Each slot preferably is generally vee-shaped. In one preferred clip embodiment, each wire-receiving slot has a slot end wall that forms a portion of an ellipse to prevent stress risers. To help reduce cracking of the clip, the clip has a generally U-shaped construction with a pair of spaced apart arms that have a cross sectional thickness that is greater than an end wall that is disposed adjacent a wire locking pin. One preferred wedgewire construction lacks reinforcing rings. Where the wedgewire screening media is to be releasably interlocked with a frame, an arm of one of the clips has an engaging structure that preferably is a projection that comprises a hook.

In a preferred method of making a wedgewire screen media, a plurality of pairs of wires are spaced apart by at least two thousandths of an inch to permit a wear resistant flowable coating to coat portions of each wire along the inlet side of the screen media and downstream of the throat of each screening slot. Preferably, each wire is substantially completely coated with a wear resistant coating when the coating is hardened or hardens. Thereafter, the wires are disposed in a retainer clip, locking wire is inserted through the wires and into each clip, and the assembly is formed into an arcuate shape that can be cylindrical. Such a coating arrangement improves wedgewire screen media life.

In one preferred screen cylinder embodiment, the screen media releasably interlocks with the frame using a plurality of spaced apart hook and lip arrangements. In one preferred embodiment, one of the screen media and the frame has a plurality of axially spaced hooks that releasably interlock with a lip carried by the other one of the screen media and the frame. In one preferred embodiment, a plurality of wire retainer clips each have a hook that each releasably interlock with a lip integrally formed in the frame.

It is an object of the invention to provide an improved screen cylinder.

It is another object of the invention to provide an improved screen cylinder that releasably receives removable screen media.

It is still another object to provide a screen cylinder that releasably interlocks with removable screen media.

It is yet another object to provide an improved wedgewire screen media construction.

It is a further object to provide an improved method of making a wedgewire screen media.

It is an advantage that releasable interlocking engagement between the screen media and frame at spaced apart locations reduces stress concentrations in the screen media.

It is another advantage that the screen media is easily removable from the frame without requiring any application of heat.

It is another advantage that the wedgewire screen media lasts longer and is of economical construction.

It is an advantage that spaced apart support that opposes movement of the screen media away from the frame improves the uniformity of the gap between the rotor foil and the screen media.

It is an advantage that the screen cylinder assembly of the invention is better able to withstand stress cycling created by rotor pressure pulses during screening.

It is an advantage that the screen cylinder assembly of the invention is well suited for high consistency screening applications.

It is another advantage that screen media replacement can be performed using conventional tools.

It is an advantage that the screen cylinder assembly of the invention can be made more compact and thinner in cross section enabling it to be used in a wider variety of pulp screening applications.

It is an advantage that a wedgewire screen media of the invention is more wear resistant.

It is an advantage that a wedgewire screen media can be made lighter and more crack resistant without requiring any separate reinforcing ring attached to any retainer clip.

It is an advantage that a frame of the invention can be constructed with increased flow window surface area that increases throughput and reduces backpressure.

It is an advantage that a frame of the invention can be made thinner, lighter, and yet be stronger and better able to withstand the complex stress states experienced during screen apparatus operation.

It is an advantage that the screen cylinder and wedgewire screen media are of compact construction, rugged, durable, of simple design, of economical manufacture, and be easy to assemble and use.

These and other objects, features and advantages of this invention will become apparent from the following detailed description of the best mode, appended claims, and accompanying drawings.

BRIEF DESCRIPTION OF THE DRAWINGS

Preferred exemplary embodiments of the invention are illustrated in the accompanying drawings in which like reference numerals represent like parts throughout and in which:

FIG. 4 illustrates a flat screen cylinder frame blank used to help depict a preferred embodiment of a method of making a screen cylinder frame;

FIG. 5 depicts the blank of FIG. 4 after forming operations have been performed;

FIG. 39 is a side elevation view of one preferred embodiment of a wedgewire retainer clip;

FIG. 40 is a side elevation view of a second preferred embodiment of a wedgewire retainer clip;

FIG. 41 is a side elevation view of a third preferred embodiment of a wedgewire retainer clip; and FIG. 42 is an end elevation view depicting a preferred cross section of the wedgewire retainer clips shown in FIGS. 39–41.

DETAILED DESCRIPTION OF AT LEAST ONE PREFERRED EMBODIMENT

Figure 1:
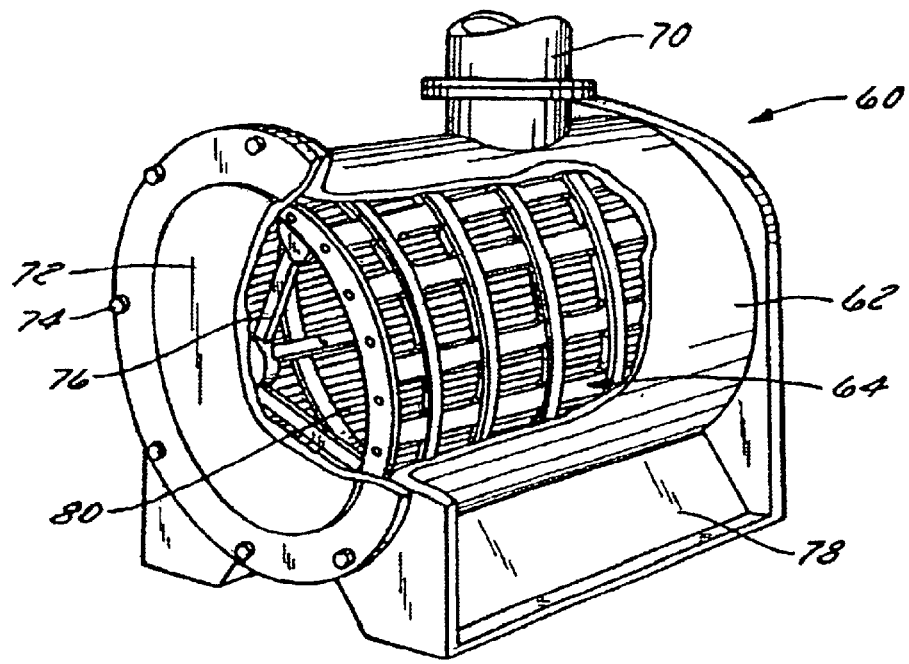
FIG. 1 is a perspective view of a screening apparatus with part of its housing cutaway illustrating a portion of a screen cylinder assembly.

FIG. 1 illustrates a screening apparatus 60 that has a housing 62 and a screen cylinder assembly 64 disposed in the housing 62. As is shown in more detail in FIG. 2, the screen cylinder 64 is comprised of a perforate screen media 66 disposed in a perforate frame 68. The apparatus 60 has an inlet (not shown), through which slurry passes, and an outlet 70, from which filtrate exits. Typically, the apparatus 60 also has a contaminant discharge (not shown), through which filtered or rejected material is removed. So that maintenance can be performed, including removal of the screen cylinder 64, the apparatus 60 typically includes a cover 72 attached to the housing 62, such as by fasteners 74. A rotor 76 can be and preferably is disposed inside the screening apparatus 60. Typically, the rotor 76 is disposed inside the screen media 66, but other arrangements are possible. The housing 62 of the screening apparatus 60 shown in FIG. 1 rests upon a pedestal 78 that spaces the apparatus 60 off the floor. Although the apparatus 60 is shown in FIG. 1 with the screen cylinder 64 oriented horizontally, other arrangements are possible. For example, the screening apparatus 60 can be constructed and arranged such that the screen cylinder 64 is oriented vertically or disposed at an angle.

During screening apparatus operation, stock to be screened is introduced through the inlet to an interior chamber 80 inside the screen cylinder 64. Typically, the stock is slurry containing fibrous matter that is screened by the screening apparatus 60 in preparation for being made into paper or some other fibrous matter based product. The stock passes through screening passages in the screen media 66 to an exterior chamber between the screen cylinder 64 and housing 62 where it then exits the screening apparatus 60 through the outlet 70 as filtrate. Fibrous matter in the stock is selectively permitted to pass through the screen cylinder 64. Contaminants and rejects are removed from the screening apparatus 60 via the contaminant discharge.

Referring once again to FIG. 2, the frame 68 preferably is cylindrical but can be tubular such that it is not cylindrical. The frame 82 is constructed and arranged to retain and support the screen media 66 during operation. In the preferred frame embodiment shown in FIG. 2, the frame 68 includes a pair of spaced apart retainer rings 82 with one of the rings 82 disposed at one end and the other of one of the rings 84 disposed at the other end. At least one of the rings 82 is removable, such as to facilitate insertion and removal of screen media 66. If desired, one of the rings 82 can be welded or otherwise fixed to the frame 68. In the preferred embodiment shown in FIG. 2, the rings 82 help retain the screen media 66 inside the frame 68 and help limit or restrict axial movement of the screen media 66 during operation.

Figure 2:
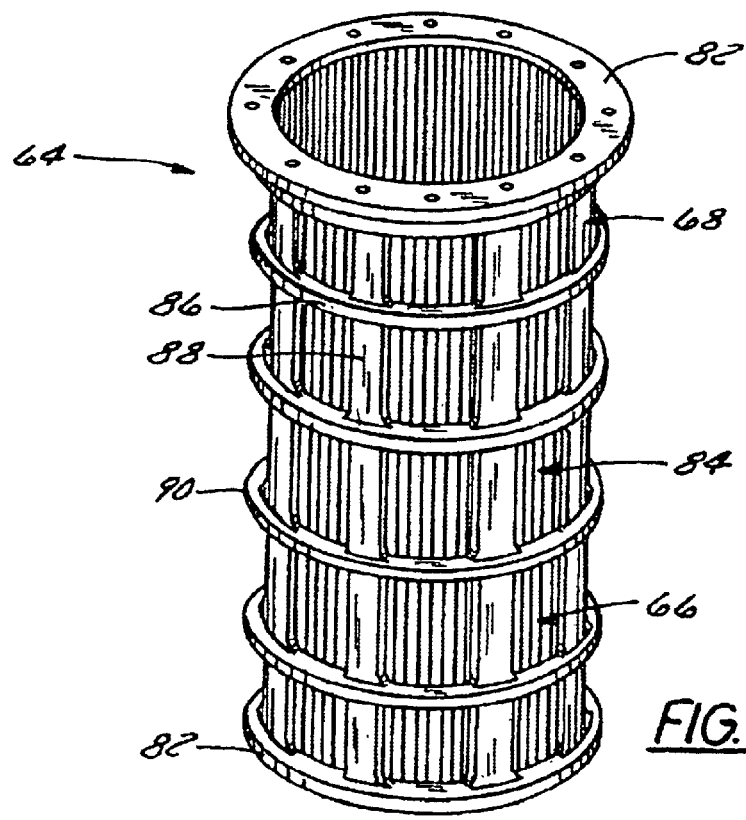
FIG. 2 is a perspective view depicting a preferred embodiment of a screen cylinder assembly that includes a screen media received inside and supported by a frame.
Figure 3:
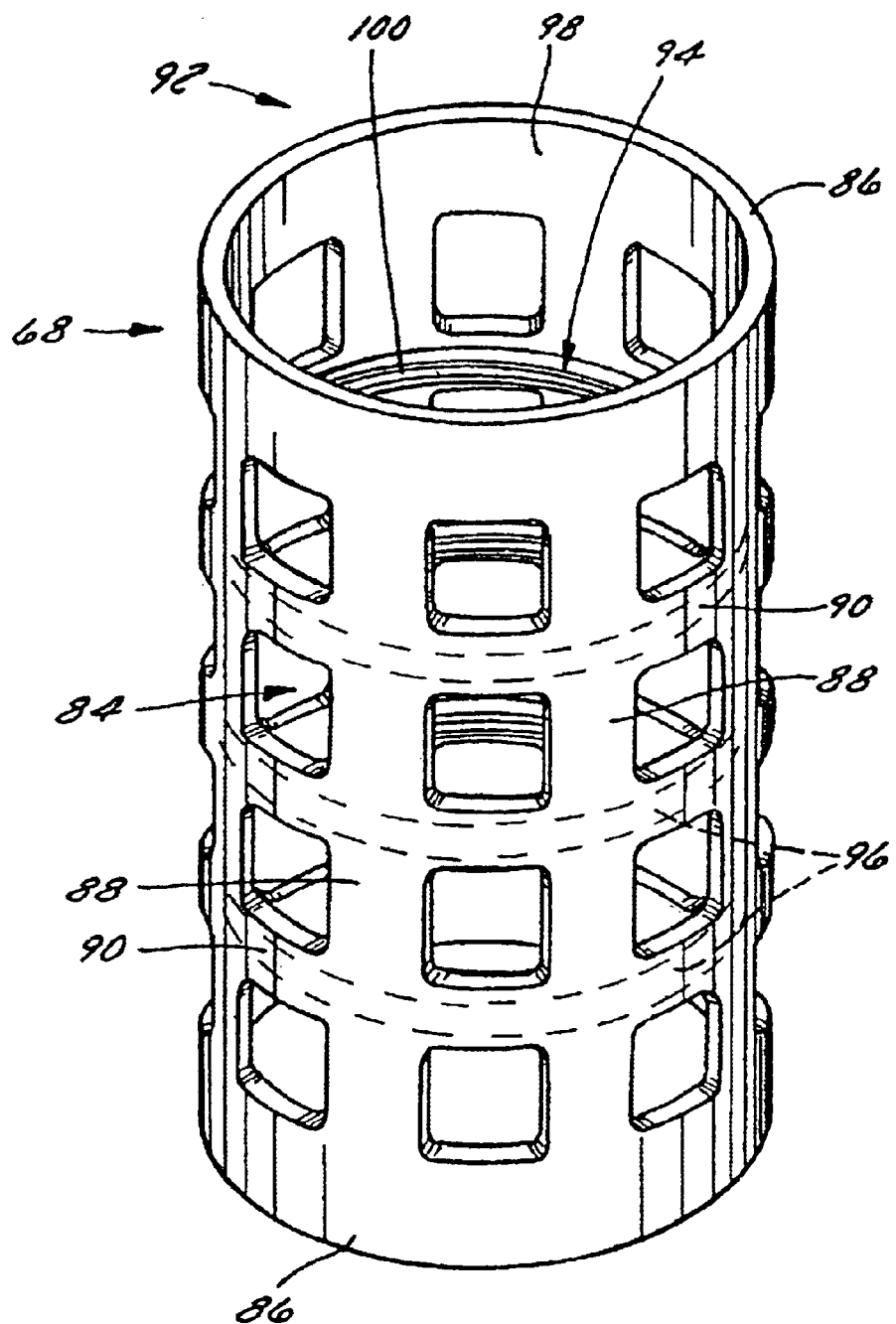
FIG. 3 depicts one preferred screen cylinder frame embodiment.

Referring additionally to FIG. 3, the frame 68 is of perforate construction and has a plurality of pairs of flow windows 84, each of which preferably extends completely through a sidewall 86 of the frame 68 to allow flow of stock therethrough. The frame 68 preferably has at least three axially spaced apart rows of flow windows 84. In the preferred frame embodiment shown in FIG. 2, the frame 68 has a plurality of circumferentially spaced apart and generally axially extending braces 88 disposed between rings 82. In the preferred frame embodiment shown in FIG. 2, the frame 68 has at least four such braces 88 that preferably are substantially equidistantly spaced apart.

In the preferred frame embodiment shown in FIG. 2, the frame 68 has at least one intermediate support ring 90 disposed generally transverse to a longitudinal axis of the frame 68. Preferably, there are at least two such rings 90. Depending upon the axial length of the screen media 66, the frame 68 has a plurality of intermediate support rings 90 and preferably has at least a plurality of pairs of such rings 90. For example, in the preferred embodiment shown in FIG. 2, the frame 68 has four intermediate rings 90. In the preferred embodiment shown in FIG. 2, each one of the intermediate rings 90 extends radially outwardly beyond an adjacent brace 88. If desired, intermediate rings 90 can be flush with adjacent braces 88, such as is depicted in FIG. 3. In screening applications where space is confined, the outer peripheral surface of each intermediate ring 90 preferably are flush with adjacent braces. In another preferred embodiment, rings 90 can project radially inwardly from the inner peripheral frame surface.

With the exception of a removable ring or cover 82 used to facilitate assembly of screen media 66, the frame 68 is constructed such that it is made of one piece and preferably is of unitary construction. In one preferred method of making the frame 68, the frame 68 is cast or molded. Where the frame 68 is cast of a metal, the frame preferably is cast of a stainless steel.

Referring to FIG. 3, in one preferred method of making the frame 68, a blank that is a tube 92 of one piece and unitary construction, preferably an extruded tube or a forged tube, is used and the flow windows 84 are formed in the tube 92. The tube 92 can also be statically cast. The tube 92 preferably is cylindrical.

In making the frame 68, the tube 92 is machined, preferably by turning, to tolerance and to achieve the desired wall thickness. In one preferred implementation of the method, additional groove turning and/or other machining is done to the interior of the tube 92 to define a plurality of inwardly projecting integral projections 94 that each releasably engage screen media 66 to help releasably retain the screen media 66 in the frame 68. In one preferred implementation, channels 96 machined in an inner peripheral surface 98 of the tube 92 each define an inwardly projecting lip 100 that releasably interlocks with screen media 66. Each window 84 is formed in the tube 92, preferably using a cutting process. Finish turning is performed on the portions of the tube 92 that need it to improve dimensional fit. To the extent needed, the tube 92 is thereafter buffed, deburred and polished.

Figure 6:
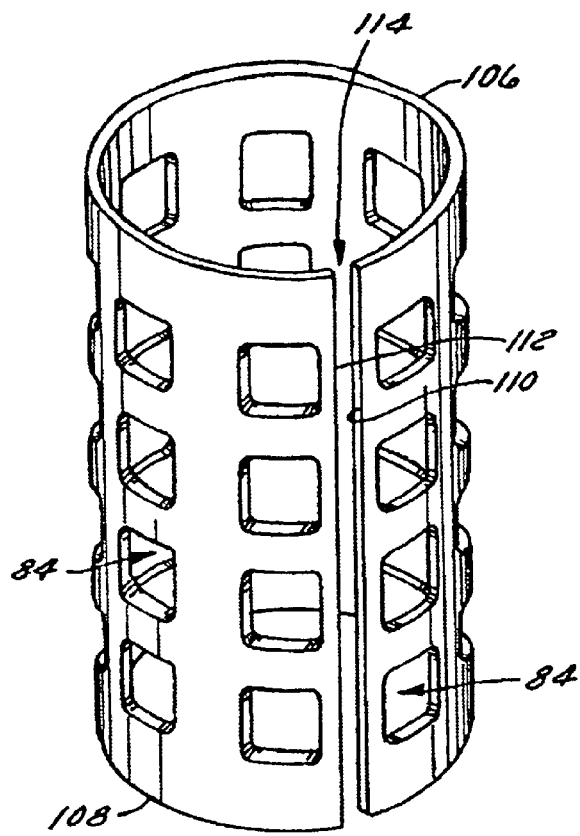
FIG. 6 depicts shaping the blank into a tube.
Figure 7:
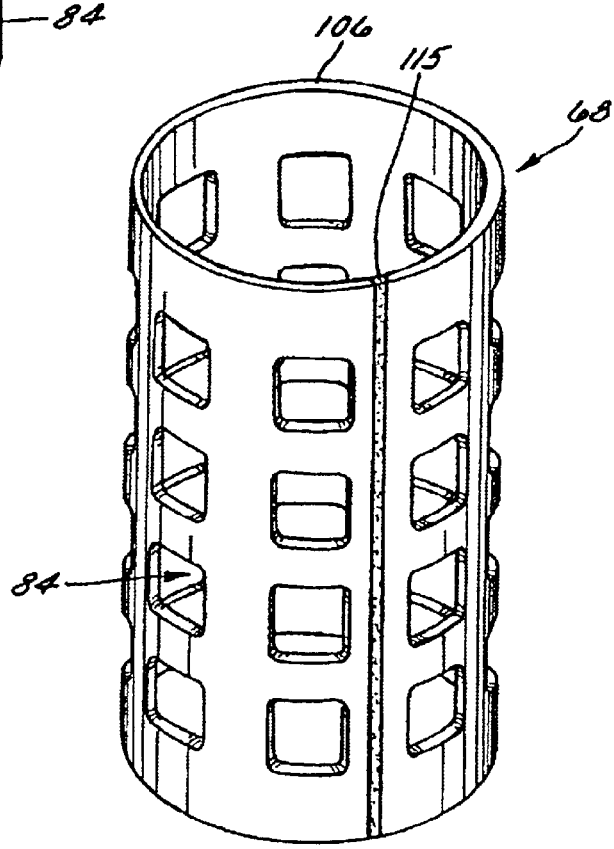
FIG. 7 depicts bonding edges of the blank together along a seam.

FIGS. 4–7 depict another preferred method of making a frame 68 of the invention using a plate 102 that can be flat. Referring to FIG. 5, windows 84 are formed in the plate 102, preferably while the plate is in a flat condition. A plurality of pairs of axially spaced apart screen media interlocking structures 103 are formed into the surface 98 that will face toward the screen media 66. Preferably each interlocking structure 103 comprises a channel 96 formed into peripheral surface 98, preferably by machining, to create a lip 100 that can releasably interlock with screen media 66. Referring to FIG. 6, the plate 102 is rolled or otherwise formed into a tube 104 having a pair of opposed circumferentially extending edges 106, 108 and a pair of adjacent axially extending edges 110, 112 that define a seam 114 therebetween. Thereafter, axially extending edges 110, 112 are joined together, preferably by a bond 115. In one preferred implementation, the bond 115 preferably is a weld.

One preferred example of a plate 102 that can be used to make the frame 68 is a piece of sheet metal having a thickness of at least ¼ inch. Sheet metal is advantageous because it is inexpensive, easy to form, and the windows 84 can be inexpensively punched. Where sheet metal is used as plate 102, it preferably has a thickness of between ¼ inch and ½ inch so the windows 84 can be punched.

Figure 8:
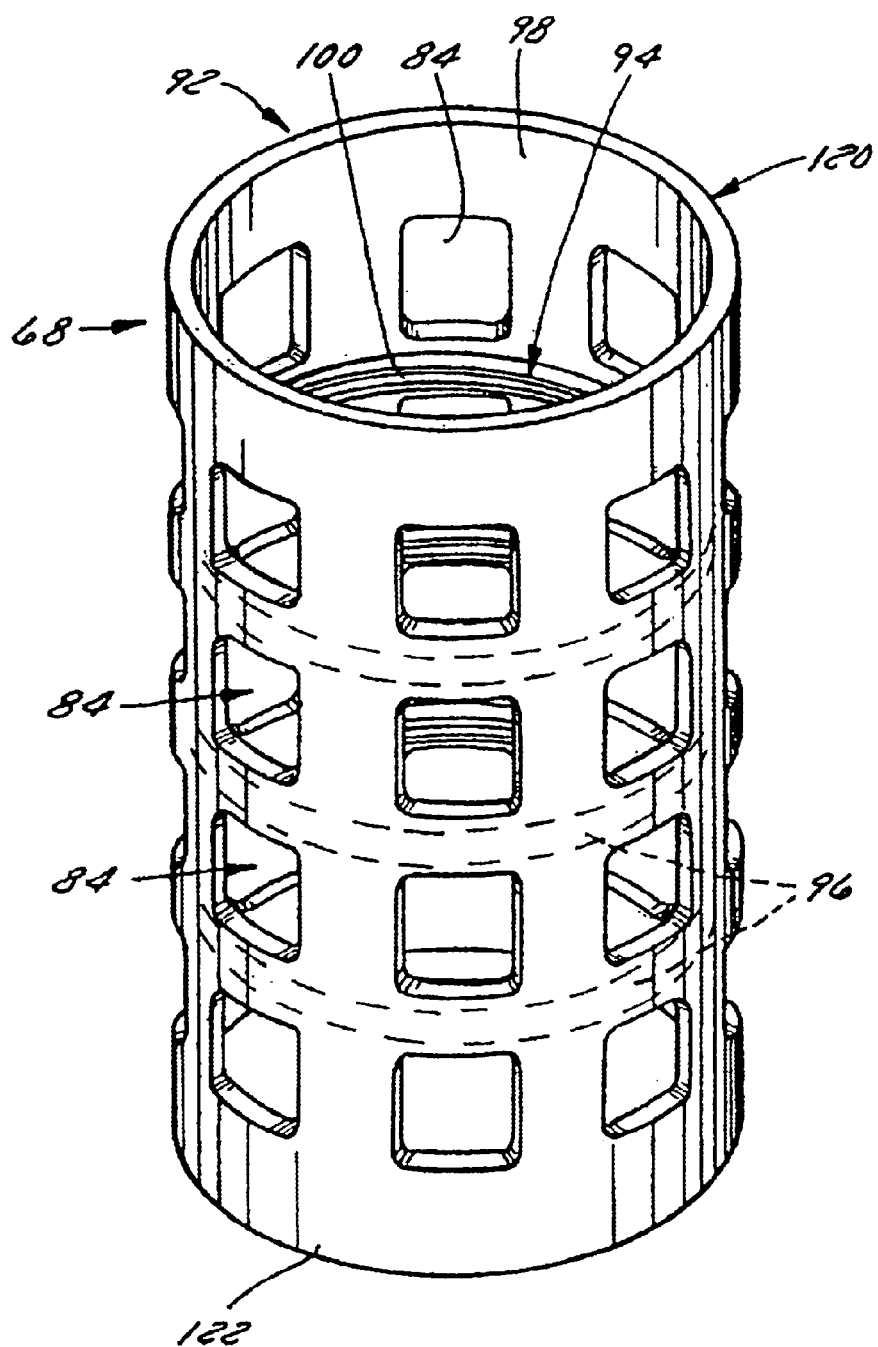
FIG. 8 illustrates another preferred embodiment of a screen cylinder frame.

Referring to FIG. 8, in one preferred method of making the frame 68, the frame is centrifugally cast. A centrifugally cast frame 68 is particularly advantageous because it has a favorable grain structure that imparts to it a high strength to weight ratio that enables the braces 88 and rings 90 to be thinner and narrower. This helps maximize the surface area of the flow windows 84 thereby increasing screening capacity. The favorable grain structure also advantageously increases the cylindrical strength of the frame 68 that, in turn, provides increased support to screen media 66 disposed in the frame 68. As a result, screen media 66 can be made of thinner, weaker, and less expensive material and still withstand positive pressure pulse of rather large magnitude created by the rotor 76 during operation. In fact, screen media 66 need not be self-supporting as the frame 68 provides support. The screen media 66 can be made so thin and flexible such that it substantially conforms to the contour of the frame 68 when subjected to the pressure of stock during operation.

A centrifugally cast frame 68 is also advantageous because it is not welded and therefore does not suffer from potential and actual weld defects. A cast frame 68 is also advantageous because the flow windows 84 can be cast in place, saving assembly and fabrication steps. A centrifugally cast frame 68 is also advantageous because it produces a frame 68 that is more cylindrical, i.e., truer, and that needs minimal machining to bring it to the desired wall thickness, dimensional tolerance, and cylindricity that is desired.

Improved frame cylindricity means that screen media 66 disposed inside the frame 68 is also truer. Where the frame 68 is intended to be cylindrical, a more circular, more cylindrical frame 68 and screen media 66 provides a more consistent gap 116 (FIG. 17) between the screen media 66 and a foil 118 (FIG. 17) of the rotor 76, which improves screening efficiency. Screening efficiency is improved because the foil tip clearance, i.e., gap 116, is more uniform and preferably substantially the same along virtually the entire adjacent screen media surface area enabling more of the entire screen media 66 to effectively filter stock during operation. More specifically, rotor gap 116 is more consistent axially and circumferentially because a truer frame 68 makes the screen media 66 truer. As a result, screening performance is improved.

A centrifugally cast frame 68 is also beneficial and flexible because it can be used for virtually any screening application because of its high strength-to-weight ratio, excellent structural rigidity, increased toughness, decreased likelihood of crack-related failure, and increased torsional strength. More specifically, as a result of one or more of these benefits, such a cast frame 68 can be constructed with a thinner sidewall that advantageously enables it to be used for screening applications where the total thickness of the screen cylinder 64 is as thin or thinner than ¾ inch (19 mm). For such applications, the cross sectional frame thickness is ⅜ inch (9.5 mm) or thinner. This is heretofore not believed to be possible for conventional self-supporting screen media and conventional frames that hold screen media.

The use of centrifugal casting is also advantageous because it enables a frame 68 to be custom tailored for the particular screening apparatus in which it is disposed. For example, the braces 88 and support rings 90 can be made thicker or thinner depending on the particular application. Additionally, the frame 68 can advantageously be made with unique window configurations that help impart the frame 68 with properties unique to its particular application. The increased strength provided by centrifugally casting the frame 68 enables it to be used in combination with screen media in particularly aggressive screening applications, such as high consistency screening where stock consistency is greater than 2%, or where an aggressive rotor arrangement produces pressure pulses of relatively high magnitude.

Continuing to refer to FIG. 8, in one preferred method of making the frame 68, a generally cylindrical tube 120 is centrifugally cast to rough dimensions. The tube 120 preferably is open at each end. If necessary, the tube 120 is machined to tolerance, preferably by turning the surface 98 that will be located closest to the screen media 66. This is the inner peripheral surface 98 of the frame embodiment 68 shown in FIG. 8. This also helps achieve the desired wall thickness. Additional groove turning of the surface 98 that will be disposed toward the screen media 66 can be performed to create a plurality of integral projections 94 that releasably engage screen media 66 received in the frame 68. In one preferred implementation of the method, groove turning is performed to create a plurality of channels 96 that each forms a projecting lip 100 that releasably interlocks with the screen media 66. Windows 84 are formed in the tube 120, preferably using some sort of cutting process. If needed, finish turning is performed at least on the portions of the tube 120 that need it to improve dimensional fit. For example, either or both peripheral surfaces 98, 122 can be finish turned. To the extent needed, the tube 120 is buffed, deburred and polished.

Figure 9:
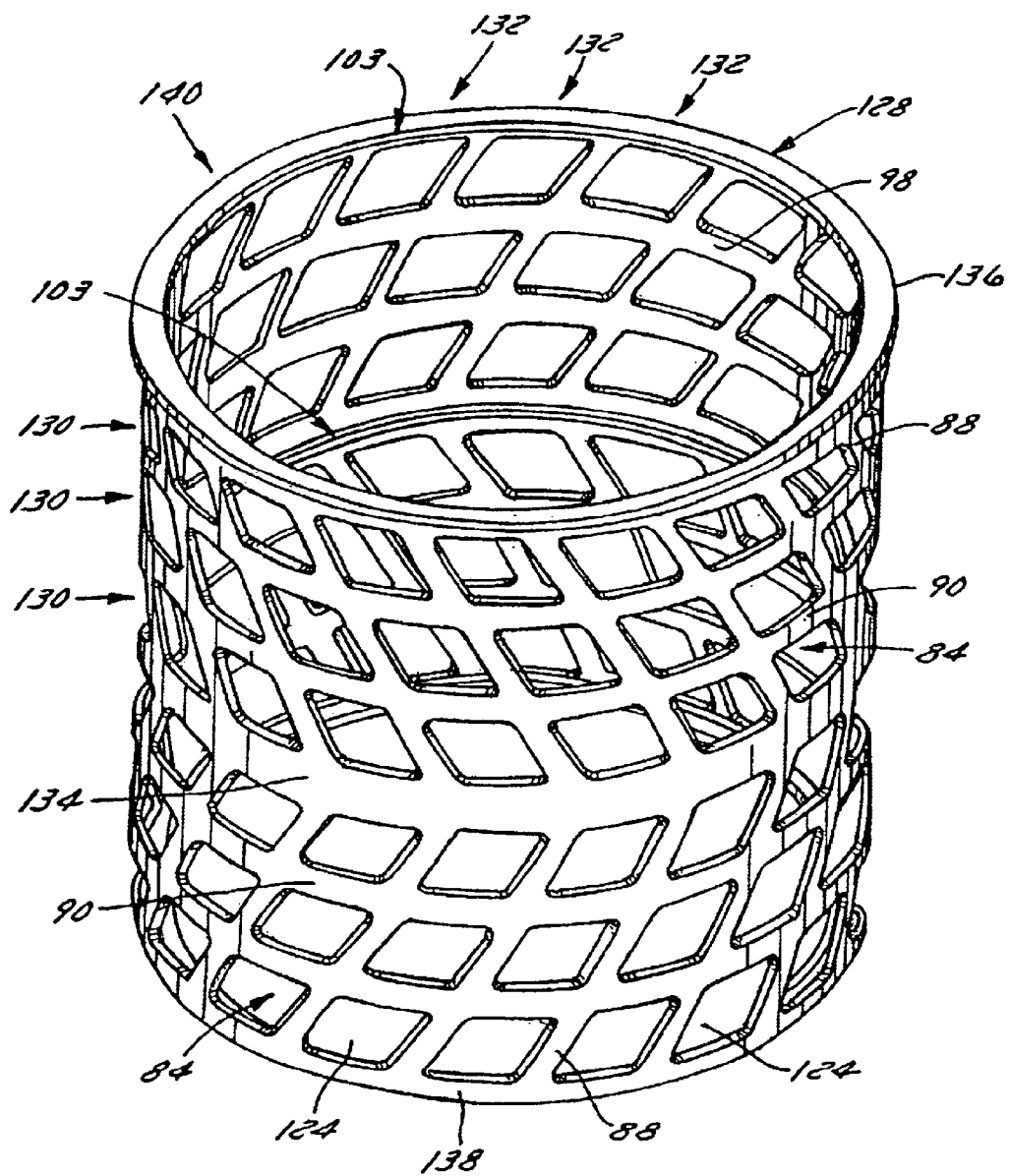
FIG. 9 illustrates a preferred embodiment of a frame that has generally diamond-shaped flow windows.
Figure 10:
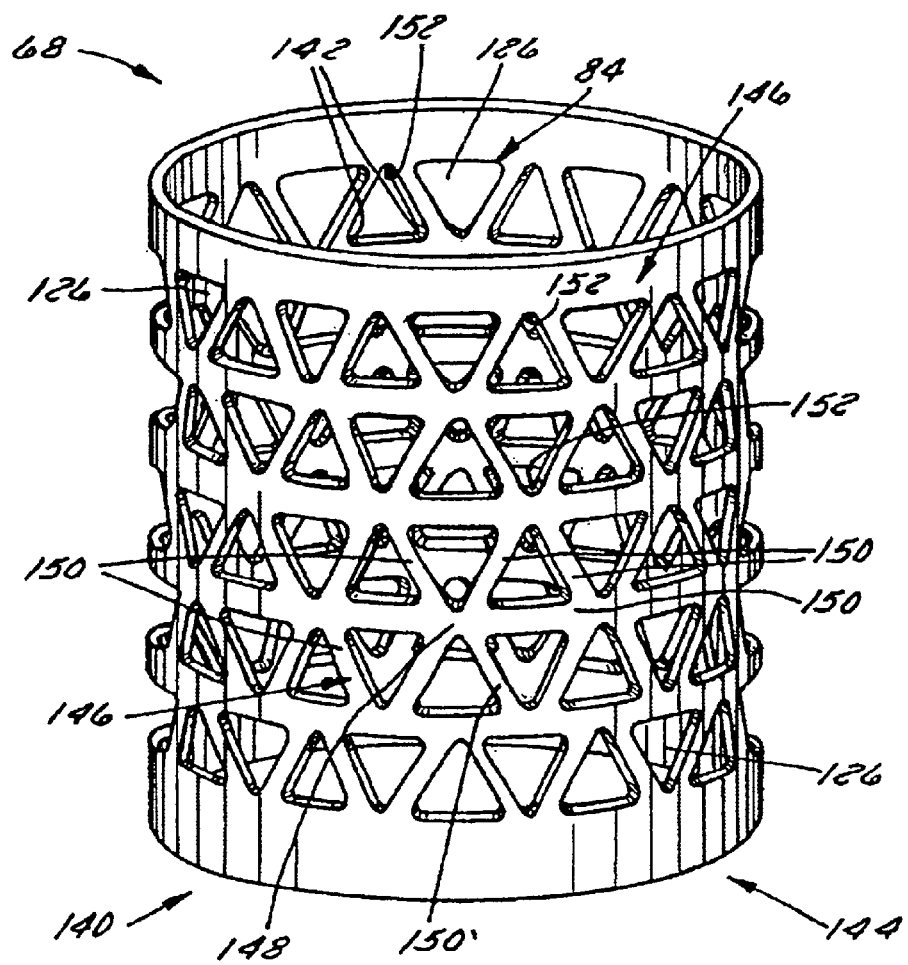
FIG. 10 illustrates a preferred embodiment of a frame that has triangularly-shaped windows.
Figure 14:
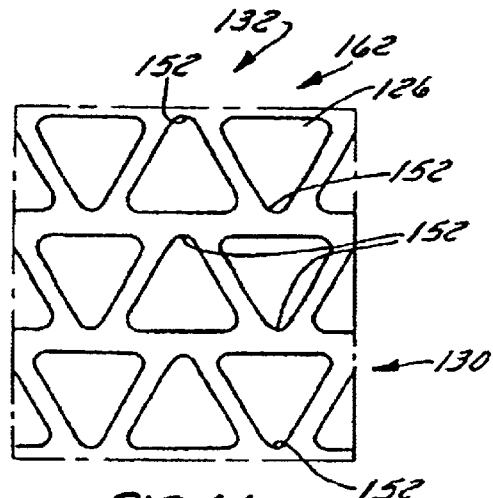
FIG. 14 illustrates a still further preferred flow window pattern.

FIGS. 9–14 illustrate a frame 68 of this invention equipped with flow windows that are polygons that are not square or rectangular. FIGS. 9 and 11–13 depict a frame 68 having flow windows 124 that are diamond-shaped or rhomboid. FIGS. 10 and 14 depict a frame 68 having flow windows 126 that are triangular.

Flow windows that are polygons that are not square or rectangular enable the frame 68 to be constructed with braces or struts 88 that extend generally in an axial direction but which are inclined at an acute angle relative outer ends 136, 138. Such flow windows enable braces 88 to be angled from an axial direction to transfer stress and strain more uniformly. Such an arrangement increases frame strength, stiffness, and torsional rigidity and enables a frame 68 of thinner sidewall construction to be used. Such a novel arrangement of flow windows and struts also advantageously increases the ratio of flow window area relative to the total area of the frame 68. Preferably, this arrangement helps enable flow window surface area to make up at least 50% of the total surface area of the frame 68. As a result, screening capacity is increased. It also enables a frame 68 that holds screen media 66 to be used in screening applications where space previously prevented use of a multi-piece screen cylinder configuration.

FIG. 9 illustrates a preferred embodiment of a frame 68 that comprises a frame cylinder 128 equipped with diamond-shaped flow windows 124. The frame cylinder 128 has a plurality of pairs of rows 130 and columns 132 of windows 124 and preferably includes one intermediate support ring 134 disposed between a pair of adjacent window rows 130 that is wider in an axial direction than at least one other support ring 90. In the preferred frame embodiment shown in FIG. 9, the wider ring 134 is disposed between a pair of narrower rings 90. In the preferred embodiment of the frame 68 shown in FIG. 9, the wider intermediate ring 134 is centrally located.

In the preferred frame embodiment shown in FIG. 9, the frame 68 has one set or array of flow windows 84 disposed on one side of central ring 134 and another set or array of windows 84 disposed on the other side of the ring 134. The frame 68 has a plurality of pairs of braces 88 disposed on each side of the ring 134. Each one of these braces 88 preferably is disposed at an acute angle relative to the ring 134, which preferably is disposed transverse to the longitudinal axis of the frame 68. As a result of braces 84 being inclined in this manner, stress is transferred along the inclined braces 88, which helps minimize strain and deflection of both the frame 68 and the screen media 66 disposed in the frame 68 during operation. In one preferred embodiment, the braces 88 extend helically, such as in the manner shown in FIG. 9.

In the preferred embodiment shown in FIG. 9, braces 88 are inclined at an acute angle of between 30° and 90° relative to ring 134 to more uniformly absorb stress and strain from screen media 66 disposed in the frame 68 during operation. In a preferred embodiment, the braces 88 are disposed at an angle of about 45°.

In the preferred embodiment shown in FIG. 9, at least one brace 88 is inclined in one direction on one side of the wider ring 134 at a first angle relative to the ring 134 and at least one brace 88 is inclined in another direction on the other side of the ring 134 at a second angle relative to the ring 134, the magnitude of which is the same or about the same as the first angle. In the embodiment shown in FIG. 9, the braces 88 on either side of ring 134 are disposed at acute angles such that one of the braces 88 on one side is canted in one direction and the other one of the braces 88 on the other side is canted in another direction. Preferably, each brace 88 on one side of ring 134 converges with a brace 88 on the other side of the ring 134 such that windows 84 immediately adjacent each brace 88 also converge and form a chevron.

Figure 17:
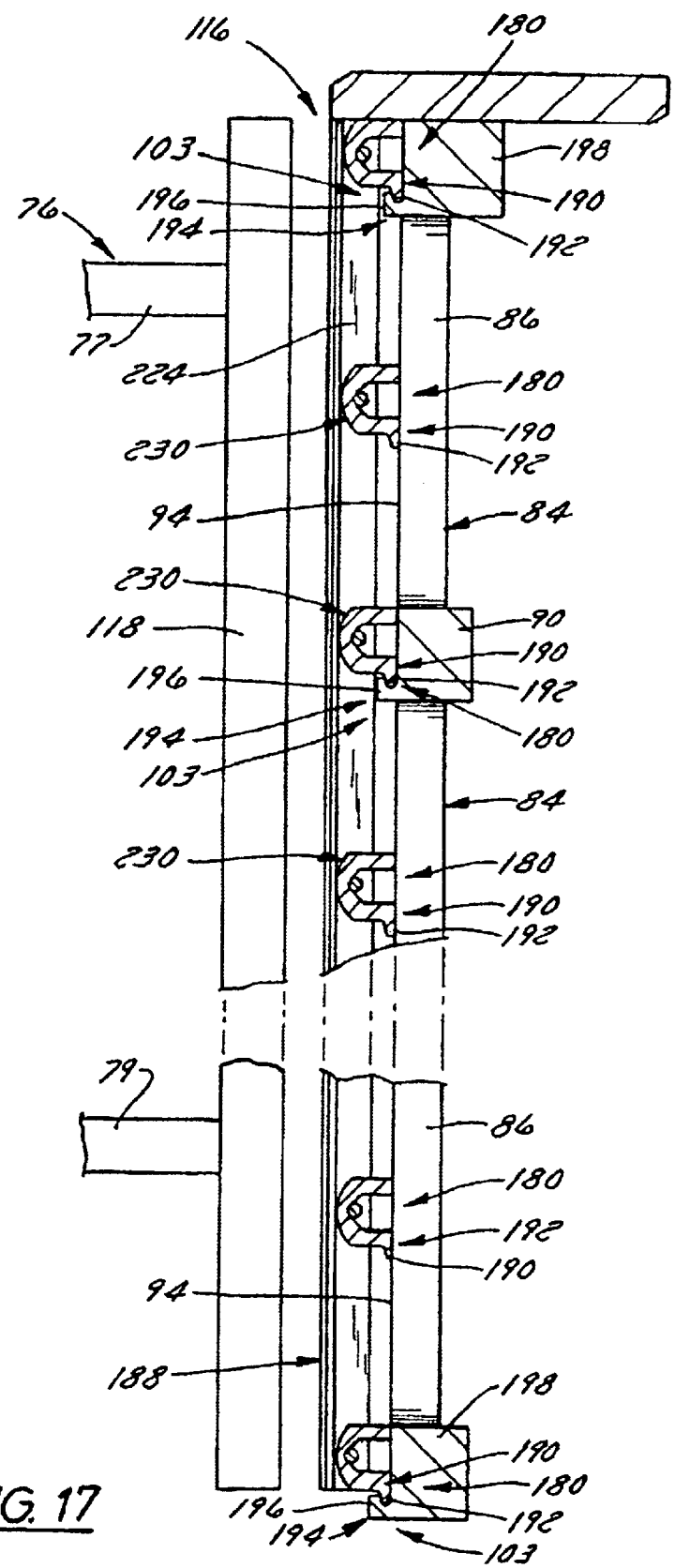
FIG. 17 illustrates a cross section of a screen cylinder assembly of the invention.

Arrangement of windows 84 and braces 88 in such a novel pattern advantageously also permits a thinner walled frame 68 to be used. This is advantageous as it enables such a frame and screen media to be used for screening applications where the screening apparatus 60 has rather tight packaging requirements. Without regard to wall thickness, this pattern of braces 88 advantageously better accommodates and resists twisting, and hence deflection, of the frame 68 during operation. More specifically, the pattern of braces shown in FIG. 9 advantageously resist twisting and deflection that is ordinarily due to pressure pulses caused by rotation of the foil 118 (FIG. 17). This brace arrangement also more uniformly transmits and distributes forces experienced by the screen media 66 also to help minimize strain and deflection of the screen media 66. This also helps keep the gap between the foil 118 (FIG. 17) and screen media 66 more uniform, which improves efficiency and throughput. The diamond-shaped or rhomboid windows 124, arranged in the novel pattern shown in FIG. 9, helps support screen media 66 better than a frame with square or rectangular windows, which thereby helps prevent premature screen media failure.

The frame 68 shown in FIG. 9 has at least one interlocking structure 103 that extends continuously about the circumference of the inner peripheral surface 98 of the frame. Preferably, there is interlocking structure 103 carried by a top ring 136, by the center ring 134, and by a bottom ring 138. If desired, the interlocking structure 103 can extend along a portion of the circumference or be comprised of a plurality of such structures 103 disposed generally along a line that preferably extends circumferentially.

FIG. 10 illustrates a preferred embodiment of a frame 68 that is a frame cylinder 140 that has flow windows 84 that are triangularly-shaped flow windows 126. In this preferred embodiment, the triangularly-shaped flow windows 126, braces 88, and rings 90 are arranged to form a hexagonal truss arrangement 144 that provides increased strength, good shock and impact resistance, good torsional rigidity, and decreased deflection. This arrangement also produces reduced peak modal stresses. Preferably, they are reduced by at least two-thirds compared to a frame having rectangular or square flow windows. The hexagonal truss arrangement 144 extends about the circumference of the frame cylinder 140 and includes a plurality of pairs of hexagonal truss segments 146.

Each hexagonal truss segment 146 is comprised of six triangularly-shaped flow windows 126 arranged such that each window has one of its corners located adjacent and pointed generally towards a hub 148. Braces 88 and rings 90 define struts 150 that radiate outwardly from the hub 148. Preferably, the struts 150 are equiangularly spaced with each strut 150 disposed between a pair of adjacent flow windows 126. Preferably, the frame cylinder 140 has a plurality of pairs of such repeating patterns of generally triangular windows 126 and struts 150.

In the preferred embodiment shown in FIG. 10, there are two circumferentially extending rows of hexagonal truss segments 146 that extend about the circumference of the frame cylinder 140. Preferably, each frame cylinder 140 equipped with generally triangular flow windows 126 has a plurality of rows of hexagonal truss segments 146. In the preferred embodiment shown in FIG. 10, there is a plurality of pairs of axially extending columns of hexagonal truss segments 146. Preferably, each frame cylinder 140 equipped with triangularly shaped flow windows 126 has a plurality of pairs of columns of hexagonal truss segments 146.

Each generally triangular flow window 126 preferably is an equilateral triangle. To help minimize the creation of stress risers, each corner 142 of each window 126, including its apex 152 is rounded. Preferably, each corner has a radius of curvature of at least about ¼ inch. Rounded corners minimize and preferably prevent the formation of cracks by reducing localized stress concentrations or stress risers thereby producing a frame that is more robust and reliable that is less susceptible to cracking failure. In a preferred flow window arrangement, the apex 152 of each window 126 in one row is pointed in an opposite direction from the apex 152 of the window 126 in the same column located in an adjacent row. If desired, one or more rows of windows 126 can be oriented such that the apex 152 of each window 126 in that row is pointed in the same direction as a window 126 of an adjacent row that is located in the same column. In the preferred embodiment shown in FIG. 10, the apexes 152 of flow windows 126 of a given column are disposed generally axially in line with each other.

When centrifugally cast, a frame 68 equipped with hexagonal trusses and generally triangular flow windows can be constructed with a thinner sidewall that advantageously enables it to be used for screening applications where the total thickness of the screen cylinder 64 is as thin or thinner than ¾ inch (19 mm). For such applications, the cross sectional frame thickness is ⅜ inch (9.5 mm) or thinner. This is heretofore not believed to be possible for conventional self-supporting screen cylinders and frames that hold removable screen media.

Figure 11:
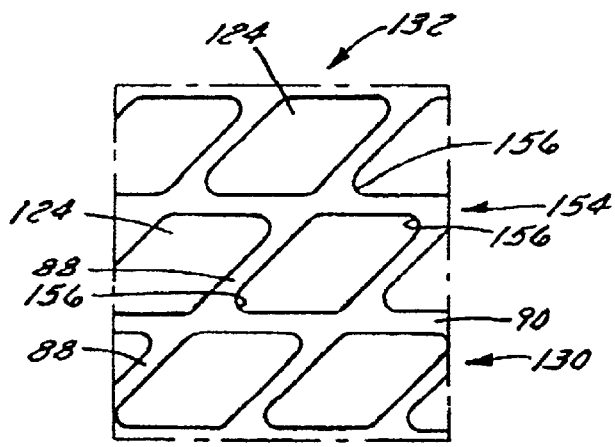
FIG. 11 illustrates a preferred flow window pattern.

FIG. 11 illustrates a portion or segment of a frame 68 that has diamond shaped flow windows 124 arranged in a pattern 154 similar to that shown in FIG. 9. As is shown in FIG. 11, the windows 124 are aligned in circumferentially extending rows 130 and the braces 88 disposed between the rows of windows 124 preferably are also circumferentially aligned. If desired, the entire frame 68 can be comprised of a repeating pattern of windows 124 having the arrangement shown in FIG. 11 or a plurality of such patterns shown in FIG. 11 can be arranged in a Chevron formation in a manner similar to that depicted in FIG. 9. Preferably, at least a majority of the windows of the frame 68 depicted in FIG. 11 are of diamond shaped construction. In the preferred embodiment depicted in FIG. 11, all of the windows 124 are diamond shaped.

In the preferred window arrangement shown in FIG. 11, the windows 124 are arranged in columns 132 that are acutely inclined relative to the longitudinal axis of the frame and that extend generally in an axial direction. In one preferred embodiment, each column 132 of windows 124 is generally helical. The windows 124 in each column have a first pair of generally circumferentially extending and parallel sidewalls that are parallel with a circumferentially extending sidewall of an adjacent window 124 located in the column. The windows 124 also have a second pair of sidewalls that are acutely angled relative to one of the sidewalls of the first pair of the window.

In a preferred diamond shaped window construction, each diamond shaped window 124 has a plurality of rounded corners 156 to help facilitate the transfer of stress and strain. Such rounded corners 156 also minimize and preferably prevent the formation of cracks by reducing localized stress concentrations or stress risers thereby producing a frame that is more robust and reliable as it is less susceptible to cracking failure. Preferably, each rounded corner 156 has a radius of curvature of at least about ¼ inch to help achieve these benefits. In one preferred implementation, at least two of the corners 156 of each rhombus-shaped or rhomboid window 124 are rounded with each such rounded corner preferably having the contour of a portion of an ellipse.

Figure 12:
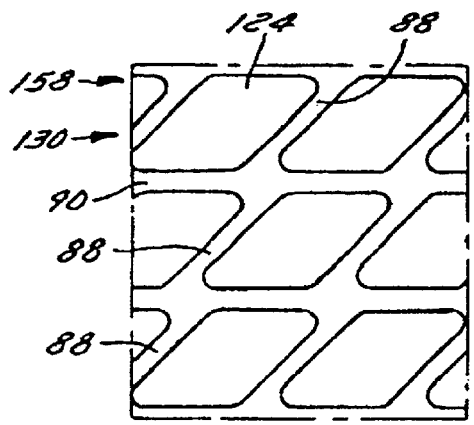
FIG. 12 illustrates another preferred flow window pattern.

FIG. 12 depicts a window pattern 158 that is similar to that shown in FIG. 11 except that the diamond shaped windows 124 form columns of staggered windows. Additionally, each brace 88 that is disposed between each pair of adjacent windows 124 preferably forms a zigzag construction with adjacent and generally aligned braces 88 to accommodate the staggered windows 124. For example, brace 88 forms a zigzag arrangement with braces 88 above and below it.

Figure 13:
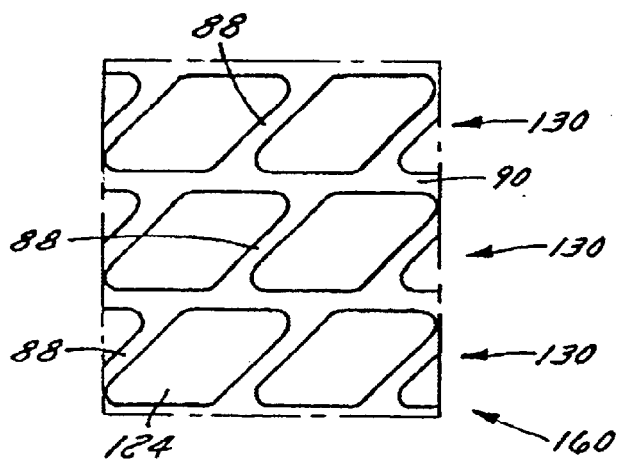
FIG. 13 illustrates still another preferred flow window pattern.

FIG. 13 depicts a window pattern 160 that is similar to that shown in FIG. 12 except that the amount of stagger is greater. More specifically, the amount of stagger is such that each window 124 overlaps at least one half of the window 124 immediately above or below it. Additionally, the braces 88 are arranged such that no part of any adjacent brace 88 above or below a particular brace 88 overlaps the brace in a generally axial direction. In the preferred window pattern 160 shown in FIG. 13, the pattern of windows 124 forms an array of circumferentially extending rows 130.

FIG. 14 depicts a window pattern 162 where all or substantially all of the windows 84 are triangularly shaped windows 126. Each corner of each triangular window 126 preferably is rounded as in the manner discussed above and each triangular window 126 preferably has the shape of an equilateral triangle. The window pattern 162 shown in FIG. 14 preferably comprises an array of triangularly shaped windows 126 arranged in a plurality of pairs of circumferentially extending rows and axially extending columns. Each triangularly shaped window 126 of each column is oriented with its apex 152 facing in the same direction such that each window 126 of each column "points" in the same direction. In the preferred arrangement shown in FIG. 14, the apex 152 of each triangularly shaped window 126 of one column points in a direction opposite of the apex 152 of each triangularly shaped window 126 of an adjacent column.

Figure 15:
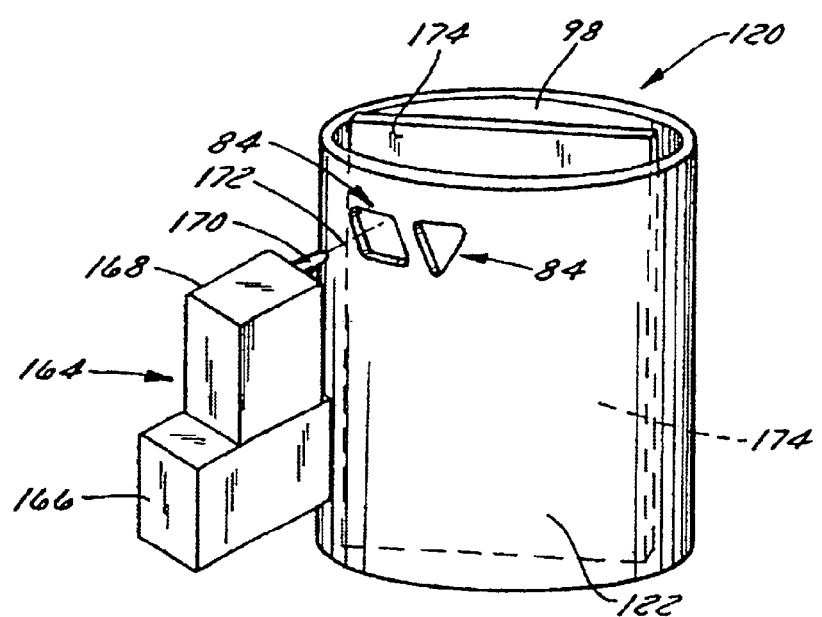
FIG. 15 illustrates a preferred method of forming flow windows in a screen cylinder frame blank.

FIG. 15 illustrates a preferred implementation of a method making a frame 68 that has flow windows 84 that are not square or rectangular. In forming each window 84, a water jet cutting process is used. FIG. 15 illustrates a water jet cutting machine 164 that preferably is carried by a motion control device 166, such as a gantry or the like. The water jet cutting machine 164 includes a head 168 that has a nozzle 170 through which a stream of liquid 172, preferably water, is ejected under high pressure toward the cylindrical frame blank 120 being cut. If desired, abrasives can be entrained in the stream 172. Although the nozzle 170 is shown spaced from the outer surface 122 of the blank 120 being cut such that a stream 172 is visible in FIG. 15, the nozzle 170 preferably is located relatively close to the outer surface 122 of the blank 120 such that it may not be possible to see a stream.

Motion control device 166 is depicted in an exemplary manner as various types of motion control devices can be used. For example, where the motion control device 166 is a gantry, the gantry preferably includes a base that carries a slide upon which at least the cutting head 168 is movably disposed. During operation, such a motion control device 166 precisely moves at least the head 168 relative to the blank 120 that is being cut. Preferably, the blank 120 is mounted in a fixture (not shown) or the like that helps maintain location of the blank 120 relative to the nozzle 170. The blank 120 preferably is rotated relative to the nozzle 170 during cutting.

A flow window 84 is being cut in FIG. 15 using a jet of high-pressure liquid 172 that cuts completely through the sidewall of the blank 120. To prevent the cutting jet 172 from impinging against the interior surface 98 of the blank 120 opposite the window 84 being cut, a barrier 174 is disposed inside the blank 120. Liquid from the cutting jet 172 that passes completely through the blank 120 impinges harmlessly against the barrier 174. The use of such a barrier 174 advantageously permits water jet cutting of the windows 84 out of any blank that is tubular and that preferably is cylindrical. Such a barrier 174 can be made of metal or another material that is suitably tough and resilient. The barrier 174 preferably is a plate of sufficient thickness so as to stop the jet 172 without the jet passing through it.

While water jet cutting is well suited for forming square and rectangular flow windows, it is particularly well suited for cutting polygon flow windows having other shapes because such complex shapes cannot be as economically cut in metal using other cutting processes. In fact, water jet cutting is particularly well suited for cutting flow windows through which stock can flow that have other non-polygonal and irregular shapes.

Water jet cutting is advantageous because it allows complex flow window shapes to be quickly and economically cut in a frame blank that is tubular and preferably cylindrical. It is also advantageous because it produces flow windows 84 that have smooth edges and smooth radiused corners. As a result, little, if any, post-cutting finishing is required, no heat affected zones are formed at or adjacent the flow windows 84, and cracks are less likely to initiate from any flow window 84 during screening apparatus operation. This helps produce a frame 68 that is stronger, tougher, more resilient, and that lasts longer.

In one preferred implementation of a method of making a frame of the invention, the blank 120 is centrifugally cast. Generally triangular windows 126 are cut by water jet cutting to form a pattern of flow windows that preferably is same as or similar to the flow window pattern shown in FIG. 10. Buffing and polishing can be performed as needed. If desired, sandblasting, shotpeening or the like can be performed, such as to eliminate burrs, or to otherwise affect the surface of the finished frame 68 including the edges of each flow window.

Figure 16:
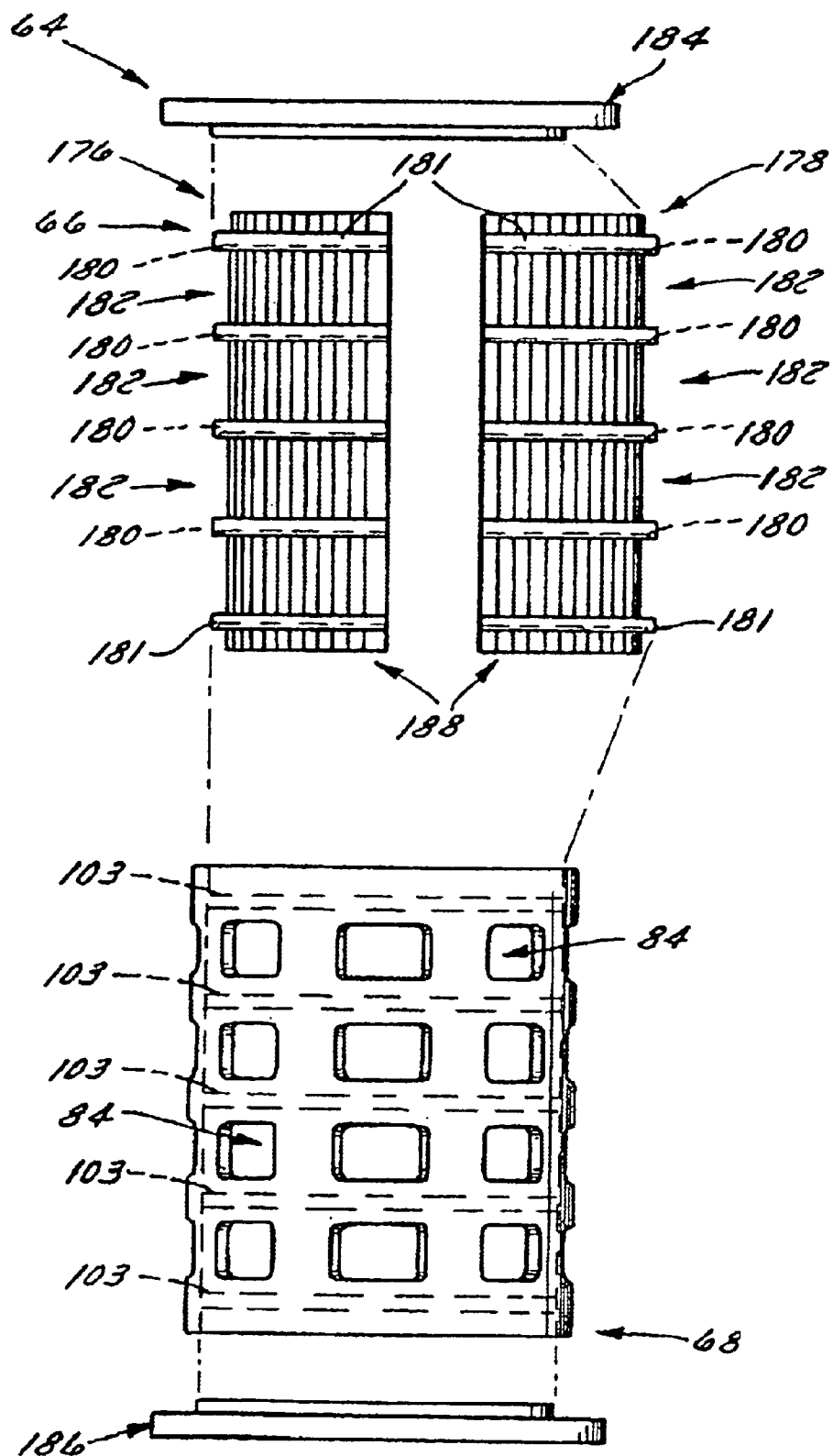
FIG. 16 illustrates one preferred method of assembling a preferred embodiment of a screen cylinder assembly of the invention.

FIG. 16 illustrates one preferred screen cylinder assembly 64. The assembly 64 includes a screen media 66 that is of perforate construction and is comprised of a plurality of screen media panels 176, 178. Preferably, the screen media 66 is of slotted construction with each screening slot (not shown in FIG. 16) sized to permit certain fibrous matter, preferably wood fiber, selectively to pass through while opposing fiber and other matter that is too large. The screen media 66 has or carries engaging structure 180 that releasably interlocks with complementary structure 103 formed in or carried by the frame 68 to retain the screen media 66 in the frame 68 without requiring the screen media 66 to be welded to the frame 68.

In the screen media 66 shown in FIG. 16, frame-engaging structure 180 preferably is disposed between adjacent rows of screening slots 182 formed in the screen media. Where the screen media 66 has a land between adjacent rows of slots 182, the frame engaging structure 180 can be integrally formed in the screen media 66 or carried by the screen media 66. For example, frame-engaging structure 180 can be welded or otherwise fixed to the screen media 66.

In the screen media 66 shown in FIG. 16, there is a plurality of pairs of axially spaced apart frame engaging structures 180. Each engaging structure 180 is shown in phantom in FIG. 16. Preferably, the frame-engaging structures 180 are axially spaced apart and disposed along the screen media 66 such that each engages a corresponding screen media engaging structure 103 of the frame 68. Because no weld secures any frame engaging structure 103 to the screen media engaging structure 180 and because there are a many locations where there is such engagement between the screen media 66 and frame 68, stress is more uniformly transmitted from the screen media 66 to the frame 68, which advantageously prevents stress concentrations from building up in the screen media 66. As a result, screen media deflection and strain are advantageously reduced and stress is advantageously more uniformly distributed, all of which prevents screen media failure. Preferably, no weld or any other type of bond secures any frame engaging structure 103 to the screen engaging structure 180. Preferably, no weld or any other type of bond attaches any portion of the screen media 66 to the frame 68. As a result, relatively minor relative movement between the screen media 66 and the frame 68 is permitted, which helps further relieve and distribute stress to prevent localized stress concentrations from building up. Additionally, the releasable interlocking that occurs between engaging structures 103, 180 opposes separation of the screen media 66 from the frame 68.

In the preferred assembly shown in FIG. 16, each panel has a plurality of axially spaced rings or flanges 181, or a segment thereof, extending outwardly from the screen media 66 that help retain and support the screen media. In the preferred assembly shown in FIG. 16, each ring or flange 181 is equipped with engaging structure 180.

In one preferred method of assembling the screen media 66 to the frame 68, a flat screen media panel is formed into a tube or cylinder before insertion into the frame 68. The screen media 66 is inserted into the frame 68 and maneuvered until each frame engaging structure 180 is disposed in engagement with a corresponding screen media engaging structure 103 of the frame 68. Force can be applied to an axial edge or end of the screen media 66, such as by using a rubber mallet or the like, to urge each engaging structure 180 of the screen media 66 into tight contact with a corresponding engaging structure 103 of the frame 68. Neither the frame 68 nor the screen media 66 is heated to facilitate assembly or disassembly. Preferably, tolerances of the engaging structures 103, 180 are selected so as to wedge the engaging structures into tight, but releasable, interlocking engagement. Tolerances can be selected so as to provide a tight friction fit between releasably interlocked engaging structures 103, 180.

In the preferred assembly 64 shown in FIG. 16, each screen media panel 176, 178 is separately inserted into the frame 68. Each panel 176, 178 is flexed or bent so as to generally curve the panel such that it can be inserted into the frame 68. Each panel 176, 178 is inserted into the frame 68 and released such that it expands against the inner peripheral surface of the frame. Each panel 176, 178 is maneuvered, preferably as it is expanded, within the interior of the frame 68 so as to releasably interlock each engaging structure 180 with an engaging structure 103 of the frame.

After the screen media 66 is assembled to the frame 68, at least one keeper, such as keepers 184, 186, can be attached to the frame 68 at or adjacent an axial end of the frame to prevent the screen media 66 from being withdrawn from the frame 68. Such a keeper preferably also prevents the screen media 66 from moving or moving very much relative to the frame 38 during operation. Preferably, each keeper 184, 186 opposes axial movement of the screen media 66 relative to the frame 68 during screening apparatus operation.

In the preferred assembly shown in FIG. 16, there is a pair of keepers 184, 186. Each keeper preferably is a ring or cover that can be of perforate construction that is attached to one end of the frame 68, such as by fasteners, by a weld, or by another method of attachment. For example, referring once again to FIG. 2, in one preferred assembly, each keeper comprises a mounting ring 82 that is attached to the frame 68 by fasteners.

After the screen media 66 has been assembled to the frame 68, the assembly 64 is inserted into the screening apparatus 60, if it is not already disposed in the apparatus. In the preferred embodiment of the assembly 64 shown in FIG. 16, the screen media 66 is a wedgewire screen media 188. If desired, other types of screening media can be used.

FIG. 17 depicts a preferred screen media 66 assembled to a frame 68. Each engaging structure 180 of the screen media 66 includes a projection 190 that extends outwardly from an outer surface of the screen media 66. In one preferred embodiment, the engaging structure 180 includes a flange 192 that extends outwardly from the projection 190. As is shown in FIG. 17, each flange 192 preferably forms a hook that extends in an axial direction.

In the engaging structure 180 shown in FIG. 17, each projection 190 preferably extends substantially the width of the screen media 66 to ensure that screen media stress is more uniformly transmitted to the frame 68 substantially along the entire projection 190, thereby avoiding stress concentrations from arising. Where projections 190 extend outwardly from a screen media 66, at least one of the projections 190 extends substantially along the entire width or length of the screen media 66.

The engaging structure 180 of the screen media 66 preferably comprises a projection 190 that engages a projection 194 of the engaging structure 103 of the frame 68 to receive and retain the screen media 66 in the frame 68. In the preferred embodiment shown in FIGS. 17 and 18, each projection 194 extends outwardly from an inner surface 98 of the frame 68. Each projection 194 preferably includes a flange 196. In the preferred embodiment shown in FIG. 17, the flange 196 comprises a lip that receives a hook 192 of an engaging structure 180 of the screen media 66.

FIG. 17 also illustrates an exemplary rotor 76. The rotor 76 typically has spaced apart arms 77, 79 that are each tipped with a foil 118 located adjacent the screen media 66. Each foil 118 preferably extends substantially the axial or longitudinal length of the screen media 66 and is rotated during operation to help improve flow through the media. Although not shown in the drawing figures, the rotor 76 preferably is carried by a shaft that is coupled to a source of rotary power that drives the foil 118.

The screen media 66 can have an engaging structure 180 disposed between a pair of rings of the frame 68. More specifically, FIG. 17 illustrates an engaging structure 180 that is disposed between an intermediate ring 90 and an upper end ring 198 of the frame 68 but which is not interlocked with any portion of the frame 68. Similarly, there is an engaging structure 180 disposed between an intermediate ring 90 and a lower end ring 200 of the frame 68.

These non-interlocking engaging structures 180 preferably are constructed and arranged to function as supports to help keep the screen media 66 from flexing outwardly toward the frame 68 by bearing against the frame 68. Where shaped like a ring, they also help support the tubular or cylindrical shape of the screen media 66 by opposing outward flexing during operation. As a result, even though these engaging structures 180 do not engage the frame 68, by preventing outward flexing of the screen media 66 by bearing against the frame 68, these non-interlocked engaging structures help ensure that the gap 116 between the foil 118 and the screen media 66 is substantially uniform. If desired, such non-engaged structures can simply be rings or the like and need not be equipped with any kind of frame engaging structure.

In one preferred embodiment, screen media engaging structure 103 is integrally formed as a support ring, such as intermediate ring 90, of a frame 68. In one preferred embodiment, each engaging structure 103 is machined from an outwardly extending portion of a support ring.

Figure 18:
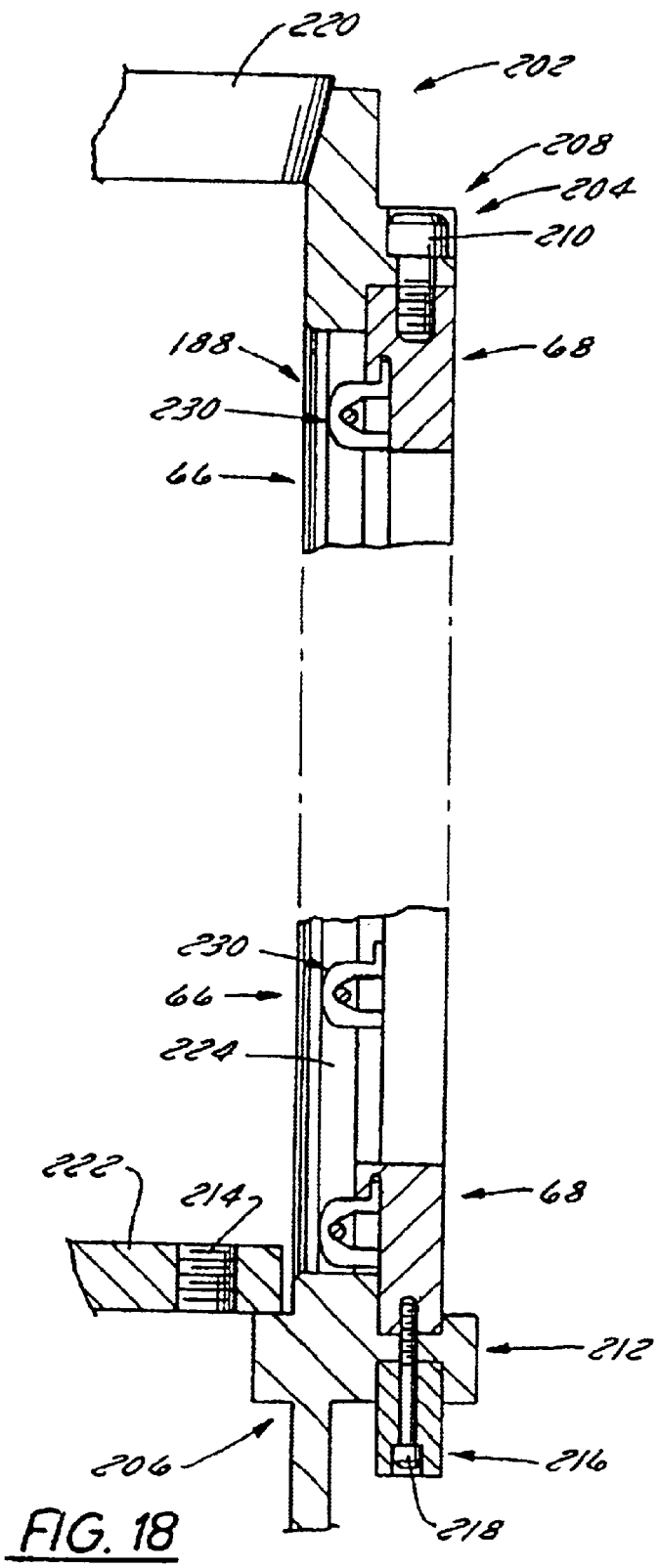
FIG. 18 illustrates a cross section of another preferred screen cylinder assembly.

FIG. 18 illustrates one preferred arrangement 202 for releasably retaining a screen media 66 that has been releasably interlocked with a frame 68, such as in a manner like that depicted in FIG. 17, to form a screen cylinder. The arrangement 202 includes first and second keepers 204, 206 that both overlie an axial end of the screen media 66 and frame 68. Each keeper 204, 206 preferably is a retainer ring that is releasably secured to the frame 68, such as by fasteners or the like. Upper ring 204 includes a flange 208 that overlies the frame 68 and receives fasteners 210, only one of which is shown in FIG. 18, that is each threadably received in the frame 68. Lower ring 206 includes a flange 212 with a channel formed therein for receiving a locking ring 216. The locking ring 216 receives fasteners 218, only one of which is shown in FIG. 18, that each extend through the ring 216, the lower ring 206, and into the frame 68.

The screen cylinder assembly can also include a pair of end caps or covers 220, 222. The end caps can be separate components or attached to a corresponding retainer ring. One or both end caps can be equipped with one or more threaded bores 214 for receiving an anchor bolt (not shown) that releasably anchors the screen cylinder to a screening apparatus 60.

Figure 19:
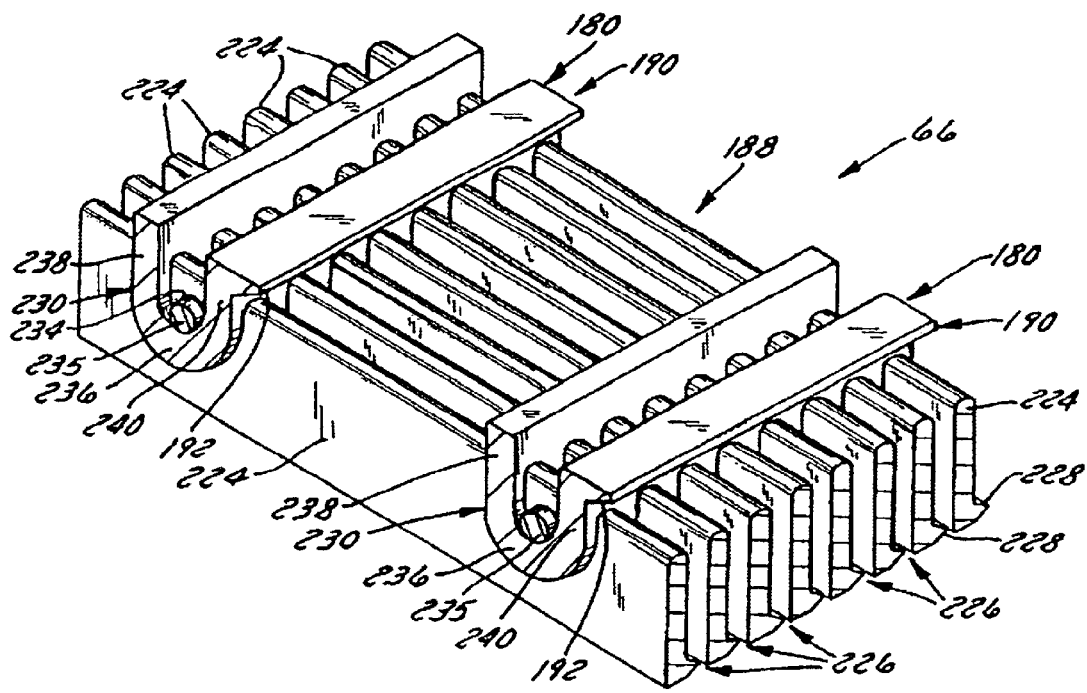
FIG. 19 illustrates a fragmentary perspective view of one preferred embodiment of a wedgewire screen media.

FIG. 19 depicts one preferred embodiment of a screen media 66 that is of wedgewire construction 188. The wedgewire screen media 188 is comprised of a plurality of pairs of parallel wires 224 that are spaced apart so as to define screening slots 226 that permit stock flow therebetween during operation. In a preferred embodiment, each wire 224 preferably is flat and of generally rectangular cross section. Each wire 224 has a ridge 228 that extends along an edge of the wire 224 and juts transversely outwardly toward an adjacent wire 224 to create a flow constriction therebetween. The distance between an outer edge of the ridge 228 and an adjacent wire 224 is selected to define a particular screening slot size to selectively allow fibrous matter of only a particular size or range of sizes to pass through. Preferably, stock being screened enters the wedgewire screen media 66 through slots 226 formed between each ridge 228 and the adjacent wire 224 closest to the ridge 228. In a preferred embodiment, each ridge 228 has the same shape and preferably is of generally triangular cross section.

Figure 38:
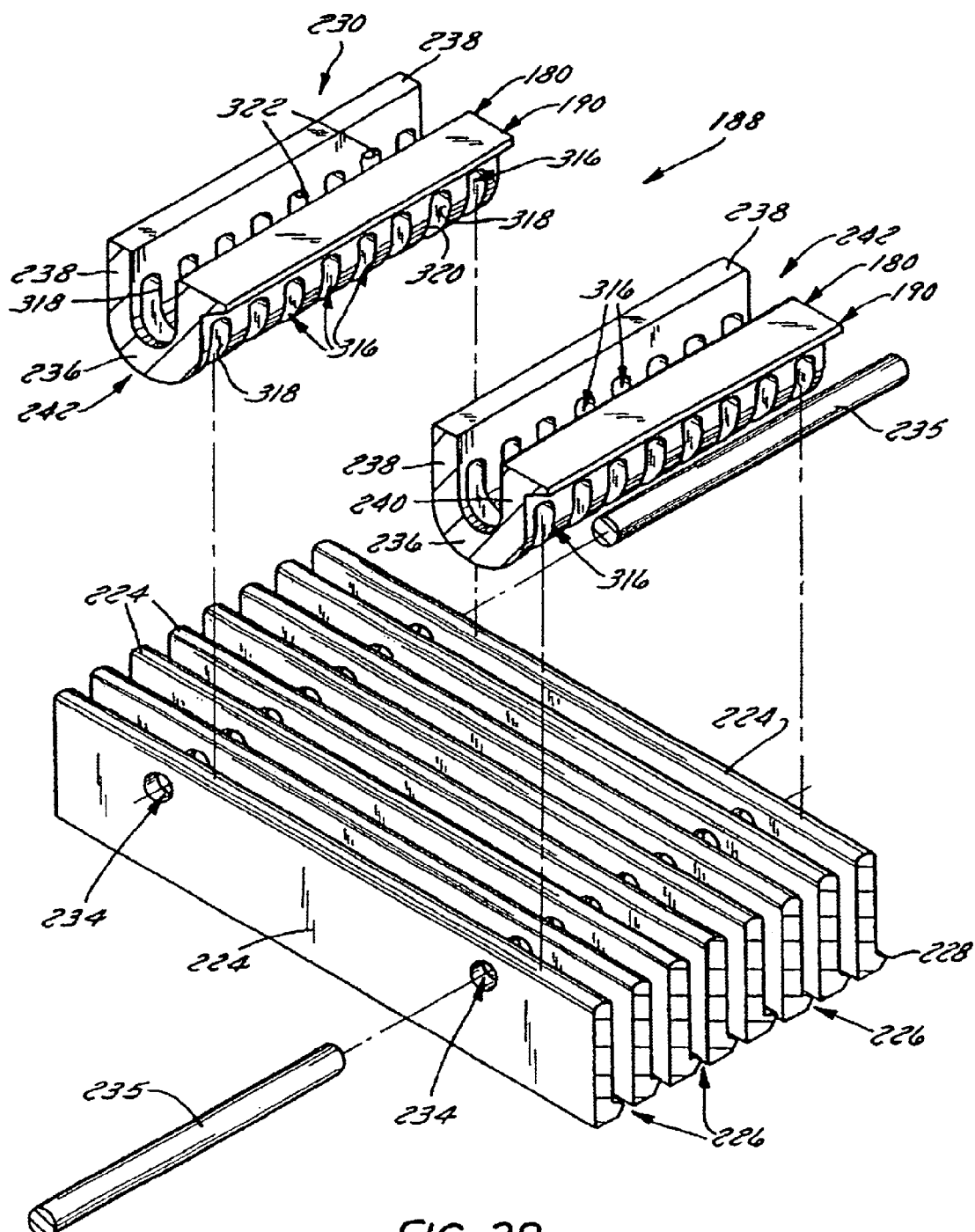
FIG. 38 is a perspective exploded view of a preferred embodiment of a wedgewire screen media.

Referring additionally to FIG. 38, desired spacing between adjacent wires 224 is provided by a plurality of elongate retainer clips 230 that each have a plurality of spaced apart wire receiving slots 316 in each of which is disposed one of the wires 224. These clips 230 also support the wires 224 to help maintain their spacing and to oppose wire deformation during screening apparatus operation. To help retain each wire 224 in the clips 230, each wire 224 has a plurality of spaced apart transversely extending through bores 234 that are aligned when the wires 224 are assembled in the manner depicted. Each set of aligned bores 234 is disposed interiorly of one of the clips 230 and receives an elongate pin 235 therein that preferably has a circular or cylindrical cross-section. The pin 235 locks the wires 224 to the clip 230. Each clip 230 is attached to the outflow side of the wedgewire screen media 188.

In the preferred embodiment of each clip 230 shown in FIGS. 19 and 38, each clip 230 preferably includes frame-engaging structure 180. Preferably, the engaging structure 180 is integrally formed as part of the clip 230. In the preferred embodiment shown in FIG. 19, each clip 230 has a generally U-shaped cross section. Each clip 230 includes an end wall 236, which is slotted, and a pair of spaced apart arms or legs 238, 240 with the engaging structure 180 integrally formed as part of one of the legs 240. The locking pin 235 is disposed in a channel 242 that is located between the legs 238, 240 when the wedgewire screen media 188 is assembled.

In the preferred clip embodiments shown in FIGS. 19 and 38, the clip 230, including engaging structure 180, is of one piece and unitary construction. Each engaging structure 180 comprises a projection 190 that extends outwardly from one of the legs 240. In its preferred embodiment, each projection 190 comprises a hook 192 that extends outwardly from the leg 240 in a direction generally transverse to the leg.

Figure 20:
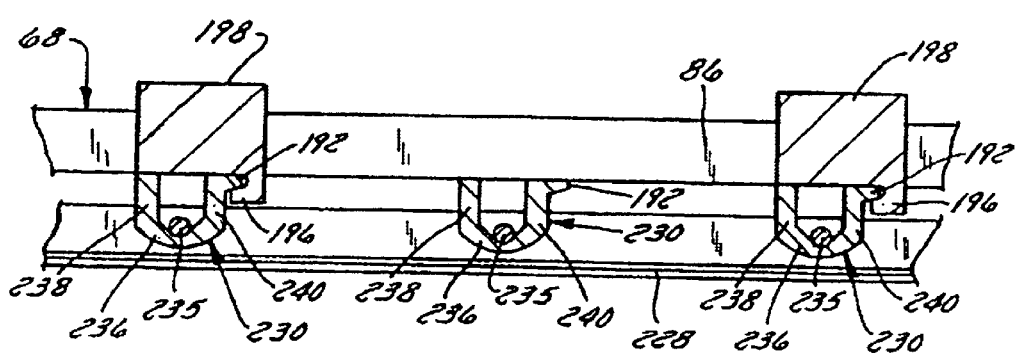
FIG. 20 illustrates a fragmentary cross sectional view of a portion of the wedgewire screen media shown in FIG. 19 assembled to a screen cylinder frame using preferred engagement structure.

FIG. 20 illustrates the wedgewire screen media 188 having wire retainer clips 230 of the type depicted in FIG. 19 releasably interlocked with a frame 68. As a result of this construction, no weld or bond attaches the wedgewire screen media 188 to the frame 68. Due to the frame 68 supporting the wedgewire screen media 188, no separate support ring is welded to any one of the clips 230. As a result, the wedgewire screen media 188 is more resistant to cracking because crack initiation sites are minimized because there are no heat-affected zones created. Such a screen cylinder construction produces a wedgewire screen media 188 that lasts longer.

As is also shown in FIG. 20, the wedgewire screen media 188 engages the frame 68 in a manner that restrains movement of the screen media toward the frame 68 and opposes movement of the screen media away from the frame. Where the screen cylinder formed by the frame and screen media assembly is cylindrical and the wedgewire screen media 188 is disposed inside the frame 68, the screen media is supported by the frame 68 from displacing and deforming radially inwardly, thereby better resisting the negative pressure pulses that occur after a rotor foil passes, and is supported by the frame from displacing and deforming radially outwardly, thereby better resisting the positive pressure pulses that occur when a rotor foil approaches. By axially spacing apart the locations of radial inward and outward supporting engagement between the wedgewire screen media 188 and the frame 68, stress is more directly and more uniformly transmitted from the screen media to the frame minimizing locations where stress can build up in the screen media. This also helps increase screen media life and helps ensure a more uniform gap between the rotor foil and the screen media.

Preferably, the wedgewire screen media 188 releasably engages the frame by interlocking with it at discrete axially spaced apart locations that are defined by regions of radially inward and outward supporting engagement that extend circumferentially substantially along the entire circumference of the screen media. Such regions, and accompanying engagement structure 180, can also be disposed along an axial direction, such as along an axially extending line. Such regions and accompanying engagement structure 180 can be discontinuous. Where the screen media is made of two or more panels, each panel preferably engages the frame at axially spaced locations with each region of engagement extending substantially along the entire periphery of each panel.

Figure 21:
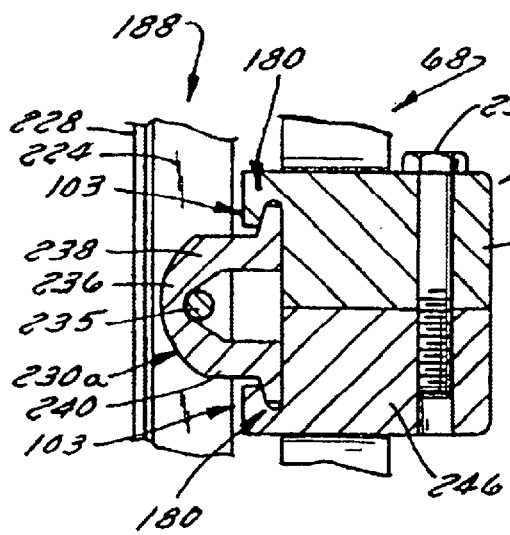
FIG. 21 is a fragmentary cross sectional view of a portion of a screen cylinder assembly depicting another preferred engaging structure.

FIGS. 21–34 depict preferred engaging structure and retainer clip embodiments. FIG. 21 illustrates a preferred embodiment of a wedgewire screen media having a generally U-shaped wire retaining clip 230a that is equipped with a pair of engaging structures 180 with one of the engaging structures extending from one arm 238 and the other one of the engaging structures extending from the other arm 240. Engaging structures 180 each engage with a corresponding one of a pair of engaging structures 103 carried by the frame 68. The engaging structures 103 extend outwardly from a mounting block 244 of two piece construction with one of its parts 246 carried by the frame 68 and the other one of its parts 248 releasably secured by a fastener 250 to the one of its parts 246.

Figure 22:
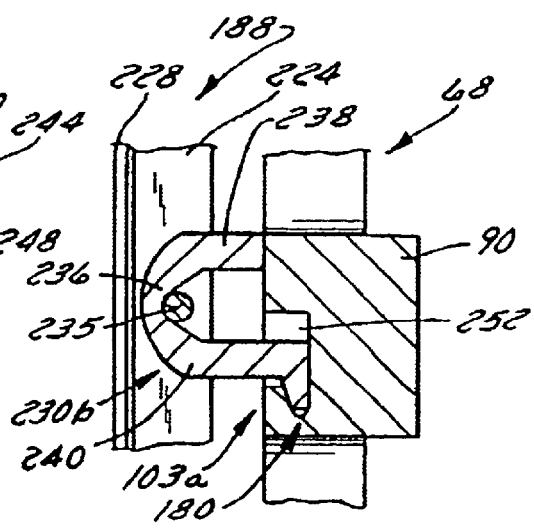
FIG. 22 is a fragmentary cross sectional view of a portion of a screen cylinder assembly depicting another preferred engaging structure.

FIG. 22 illustrates a preferred embodiment of engaging structure 103a that is integrally formed in a ring 90 of the frame 68. This preferred embodiment of engaging structure 103a comprises a pocket or recess 252 disposed in ring 90 that can be cast in place or machined. The retainer clip 230b has arm 238 that is shorter than the arm 240 equipped with engaging structure 180 to accommodate insertion of the engaging structure 180 into the pocket 252. The free end of the arm 238 preferably abuts against a portion of the frame 68, preferably against ring 90, to help keep the engaging structures interlocked. The mouth or opening of the pocket 252 preferably is large enough to permit the engaging structure 180 of the clip 230b to be inserted into the pocket 252 and urged axially into the pocket into releasable interlocking engagement.

Figure 23:
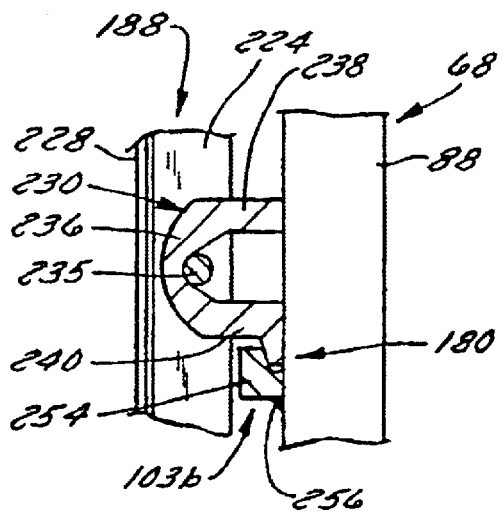
FIG. 23 is a fragmentary cross sectional view of a portion of a screen cylinder assembly depicting still another screen media engaging structure.

FIG. 23 illustrates a second preferred embodiment of an engaging structure 103b that comprises a generally L-shaped bracket 254 that is attached to a portion of the frame 68 by a bond 256 that preferably is a weld. In a preferred embodiment, the L-shaped bracket 254 is attached to a brace 88 of the frame 38.

Figure 24:
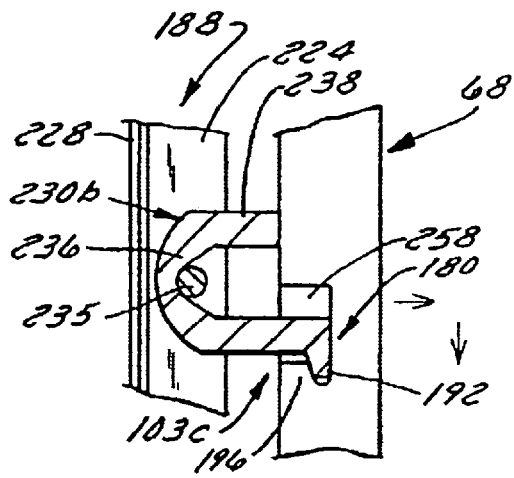
FIG. 24 is a fragmentary cross sectional view of a portion of a screen cylinder assembly depicting a further preferred screen media engaging structure.

FIG. 24 illustrates a third preferred embodiment of engaging structure 103c, which is similar to engaging structure 103a, which comprises a pocket 258 formed in a portion of the frame 68 that preferably is a brace 88. In assembly, the engaging structure 180 of the screen media 188 is maneuvered so as to enter the mouth of the pocket 258 such that it moves radially toward the frame 68. Once the engaging structure 180 enters the pocket 258, it is urged axially downward in the direction indicated until its hook 192 interlocks with the lip 196 of the engaging structure 103c.

Figure 25:
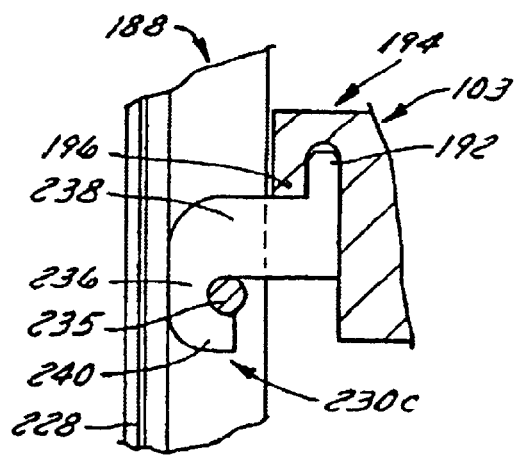
FIG. 25 is a fragmentary cross sectional view of a portion of a screen cylinder assembly depicting a still further preferred screen media engaging structure.

FIG. 25 illustrates an end view of a preferred embodiment of a retainer clip 230c that is generally S-shaped. Leg 240 curls around pin 235 and is thinner than leg 238 from which the engaging hook 192 extends. The hook 192 is received in a channel in a mount carried by the frame and interlocks with a lip 196 that extends axially from a radially extending projection 194.

Figure 26:
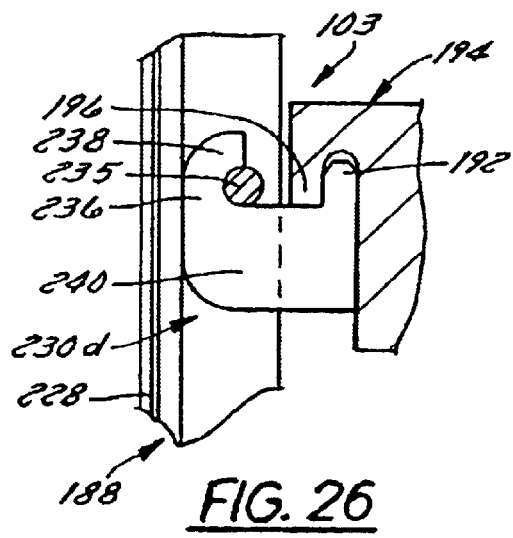
FIG. 26 is a fragmentary cross sectional view of a portion of a screen cylinder assembly depicting another preferred screen media engaging structure.

FIG. 26 illustrates an end view of a preferred embodiment of a retainer clip 230d that that has one hook-shaped leg 238 that is shorter and thinner than the leg or shank 240 to which flange 192 is attached. The hook-shaped leg 238 curls around pin 235. The flange 192 is received in a channel in the mount carried by the frame and interlocks with a flange 196 that extends in an axial direction from radially extending projection 194.

Figure 27:
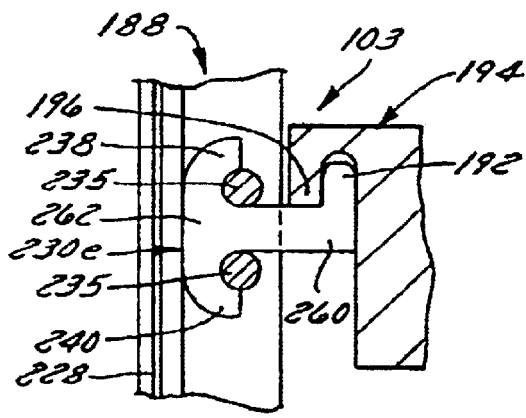
FIG. 27 is a fragmentary cross sectional view of a portion of a screen cylinder assembly depicting still another preferred screen media engaging structure.

FIG. 27 depicts a clip 230e having a center post 260 with a mushroom head 262 that splits into a pair of arms 238, 240 that both respectively curl around one of a plurality of spaced apart locking pins 235. Hook 192 extends transversely from the center post 260 and is received in a channel in a mount of the frame so as to releasably interlock with a lip of engaging structure 103.

Figure 28:
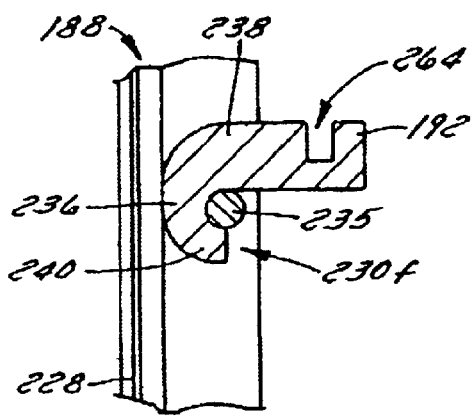
FIG. 28 is a fragmentary cross sectional view of a portion of screen media depicting a further preferred screen media engaging structure.

FIG. 28 depicts a hook-shaped clip 230f that has one leg 238 with a slot 264 formed therein that defines flange 192. The other leg 240 curls around pin 235.

Figure 29:
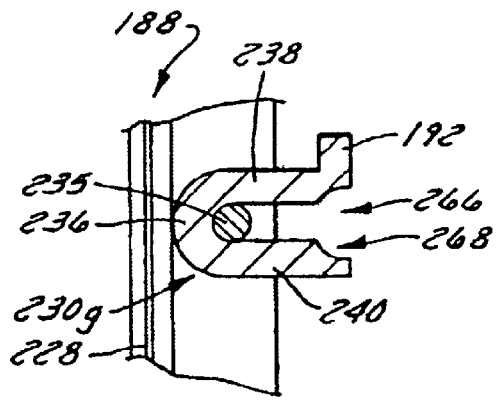
FIG. 29 is a fragmentary cross sectional view of a portion of screen media depicting a still further preferred screen media engaging structure.

FIG. 29 depicts a clip 230g that has a bore or channel 266 in it through which pin 235 extends. The channel 266 preferably has a widened mouth 268. In the preferred embodiment shown in FIG. 29, the clip 230g has a generally U-shaped cross section.

Figure 30:
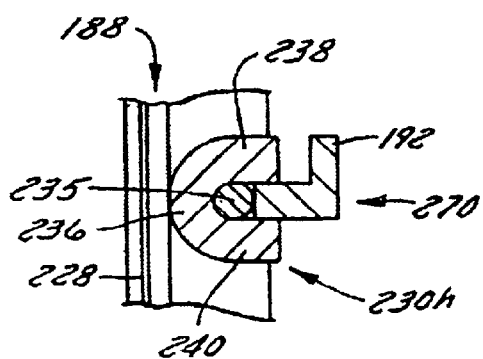
FIG. 30 is a fragmentary cross sectional view of a portion of screen media depicting another preferred screen media engaging structure.

FIG. 30 depicts a U-shaped clip 230h and an engaging structure bracket 270 disposed between the arms 238, 240 of the clip that is anchored by pin 235. Preferably, the bracket 270 is a separate component that has a bore in it through which pin 235 extends. Bracket 270 preferably is L-shaped and preferably extends the length of pin 235 or substantially the length of pin 235.

Figure 31:
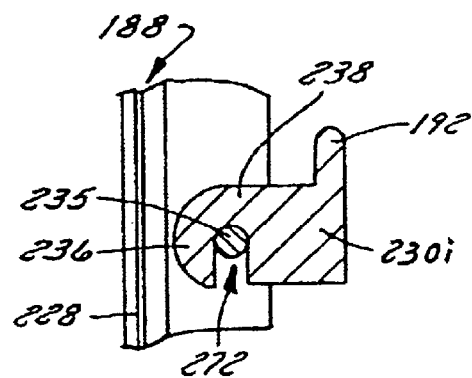
FIG. 31 is a fragmentary cross sectional view of a portion of screen media depicting still another preferred screen media engaging structure.
Figure 32:
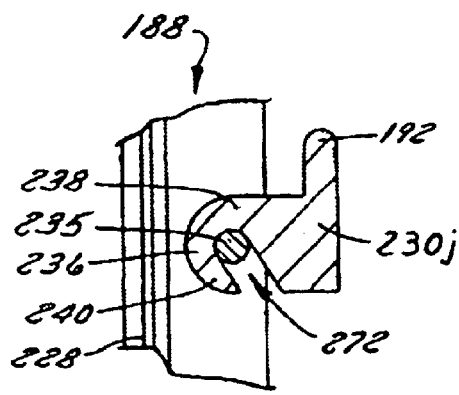
FIG. 32 is a fragmentary cross sectional view of a portion of screen media depicting a further preferred screen media engaging structure.

FIG. 31 illustrates a clip 230i that has a slot 272 parallel to flange 192 in which pin 235 is disposed. There is no leg 240 and leg 238 extends around the pin 235 in the manner depicted. FIG. 32 illustrates a similar clip 230j that has the slot 272 disposed at an angle relative to flange 192.

Figure 33:
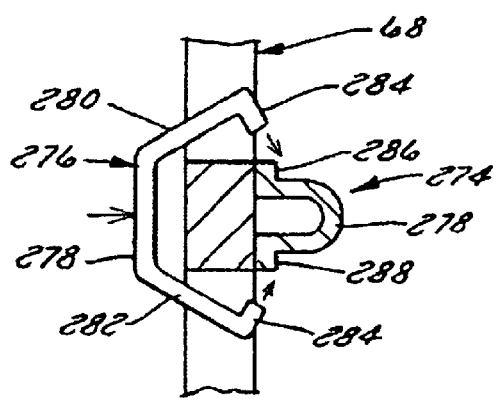
FIG. 33 is a fragmentary cross sectional view of a portion of screen media depicting another preferred screen media engaging structure.

FIG. 33 illustrates a U-shaped wedgewire screen media retainer clip 274 that is captured by an engagement clip 276 that extends around a portion of the frame 68. In the preferred embodiment shown, the clip 276 has a base 278 from which a pair of legs 280, 282 outwardly extend. Each leg 280, 282 has an inturned tang 284. When placed around a portion of the frame 68, preferably a support ring, the clip 276 is formed, such as by bending or the like, such that its tangs 284 bear against outturned flanges 286, 288 of the U-shaped wedgewire screen media retainer clip 274.

Figure 34:
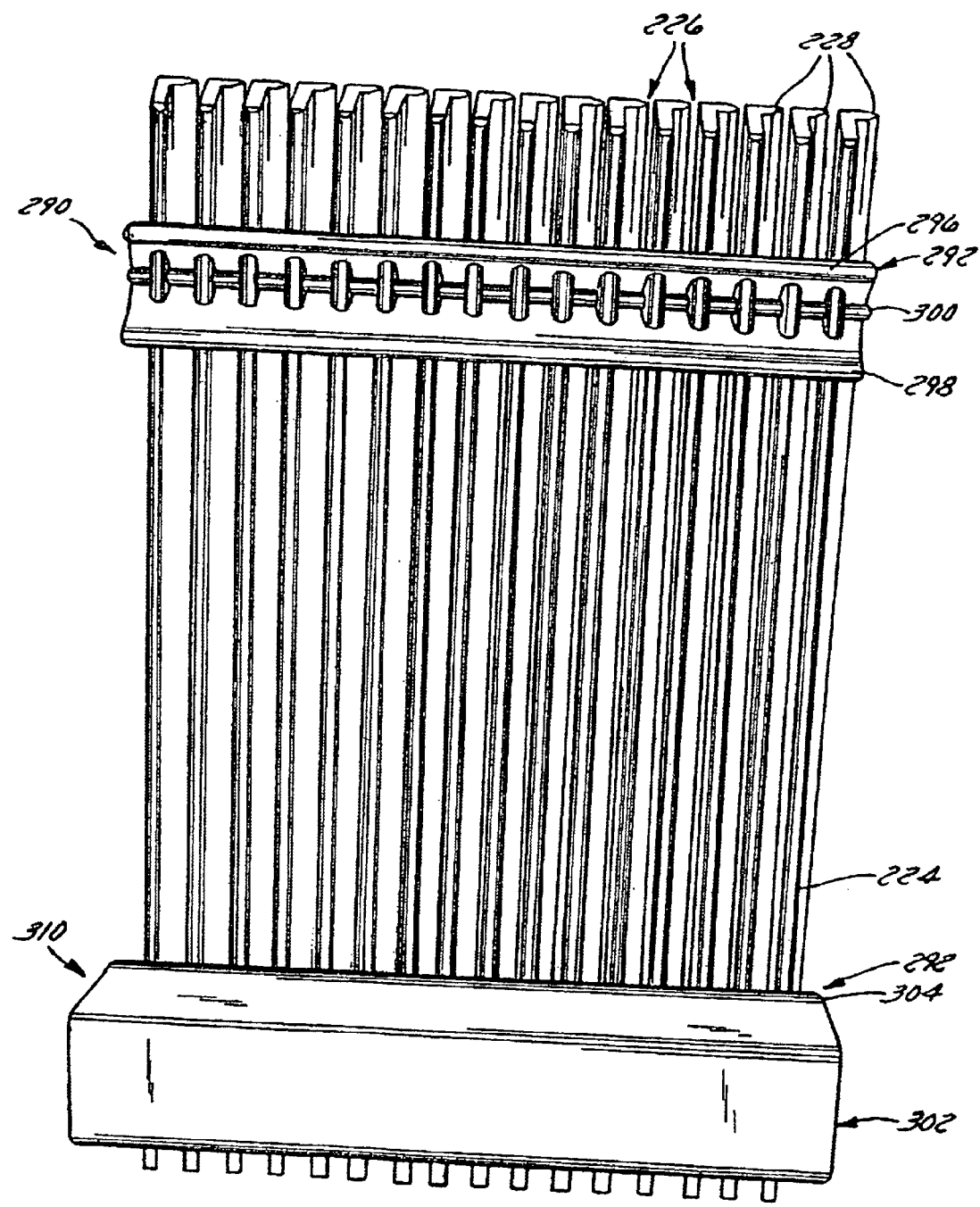
FIG. 34 depicts a fragmentary plan view of a segment of prior art wedgewire screen media.
Figure 35:
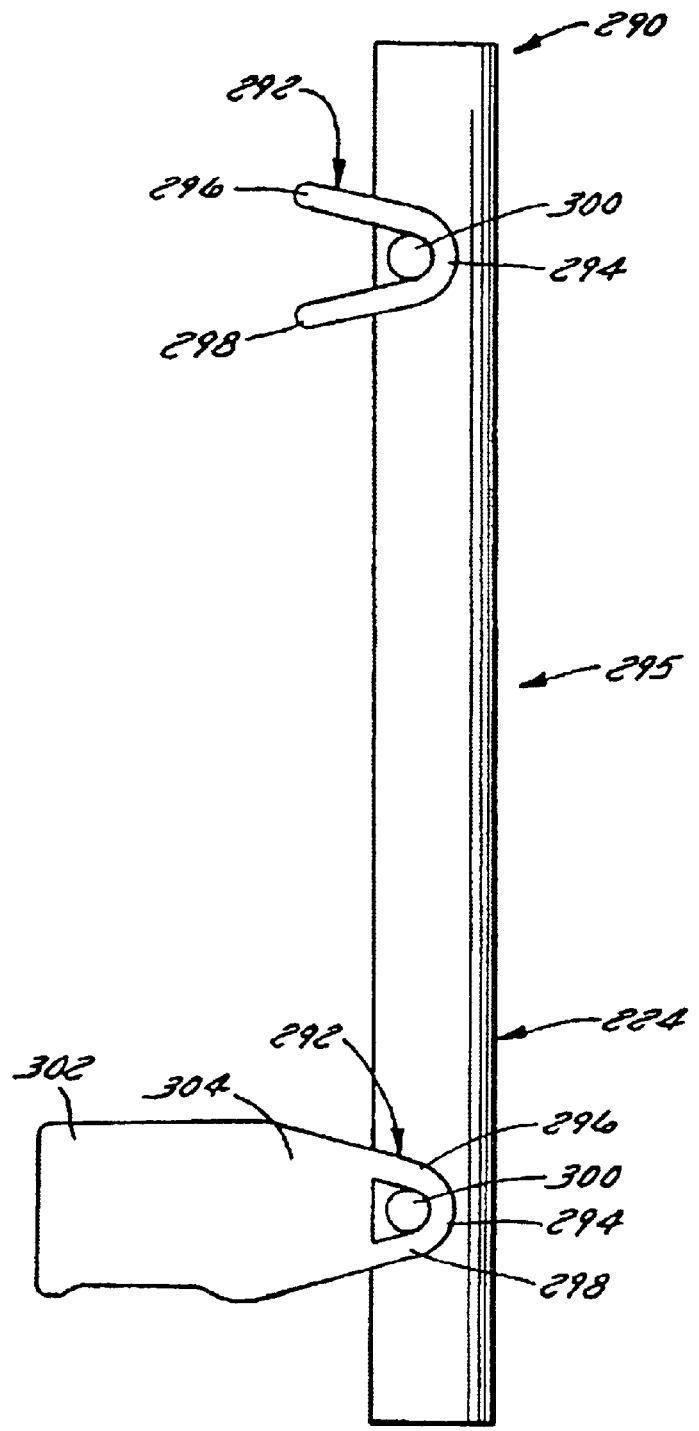
FIG. 35 is a fragmentary end elevation of the segment of prior art wedgewire screen media.
Figure 36:
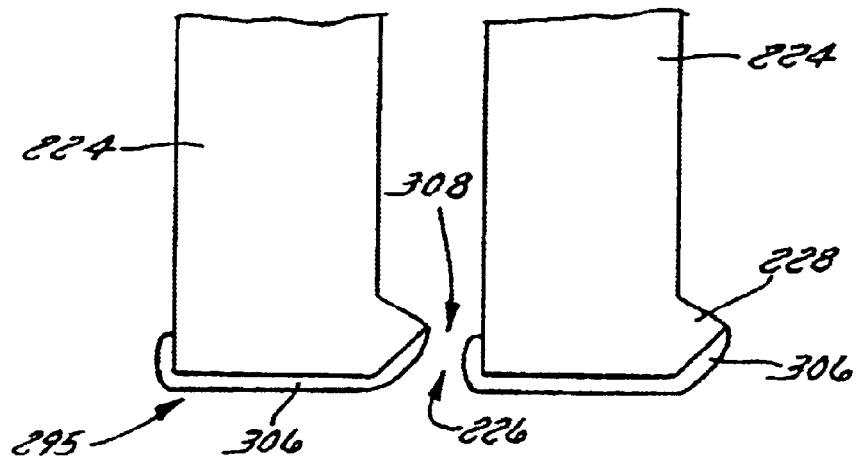
FIG. 36 is a fragmentary end elevation view of a plurality of wires of a prior art wedgewire screen media depicting a prior art coating arrangement.

Referring to FIGS. 34–36, in a prior art method of making wedgewire screen media 290, wires 224 are placed in parallel with each wire 224 received in a wire receiving slot of a generally U-shaped retainer clip 292 of conventional construction. The bend or end wall 294 of the clip is inserted toward the accepts side 295 of the wires 224 with one arm 296 of the clip disposed on one side of a locking pin receiving bore (not shown in FIGS. 34–36) and the other arm 298 of the clip disposed on the other side of bore. The locking pin 300 is then urged through the bores in the wires 224 to secure the wires 224 and the clip 292 to form a wedgewire screen media 290. Thereafter, in assembled form, the entire screen media is introduced into a vat or tank of coating material that typically is comprised of chrome or another coating material. A reinforcing ring 302 is attached by a weld 304 to a plurality of the clips 292. This can be done before or after coating is performed.

FIG. 34 illustrates a layer of chrome coating 306 that has been applied to the accepts or inlet side 295 of the screen media using this prior art method. Unfortunately, because adjacent wires 224 are spaced so closely together, typically no farther apart than about two thousandths of an inch, chrome 306 flows only as far as the throat 308 of each screening slot 226 where the slot is narrowest. The spacing between adjacent wires 224 and the surface tension of the coating being applied prevent the coating from flowing beyond the throat 308 of each slot 226.

Unfortunately, because the coating 306 does not extend beyond the throat 308 of each slot 226, each wire 224 is left exposed downstream of the throat. As a result, wear of each wire 224 is accelerated downstream of the throat 308 which undesirably increases the width of each slot 226 downstream of the throat. This wear also tends to undercut the coating 306 in the region of the throat 308, which also undesirably increases slot width. As a result, screen efficiency prematurely decreases such that the screen media must be replaced earlier than desired.

Another problem that occurs in prior art wedgewire screen media is cracking of retainer clips 292 that have welded reinforcing rings 302. A heat-affected zone 310 is created in the retainer clip 292 in the region where the weld 304 attaches the ring 302 to the clip. As a result, cracks can develop in the clip 292 during the repeated cycling the screen media encounters because it is more brittle in the heat affected zone 310. These cracks can lead to premature failure.

Another factor contributing to the failure of prior art retainer clips 292 is that their cross sectional thickness is relatively uniform along their arms 296, 298 and end wall 294. Additionally, each wire receiving slots formed in each clip 292 typically has parallel side edges that form a relatively sharp corner with its bottom edge, which create stress risers at the corner. Repeated cycling of the screen media causes the clips 292 to flex, which can lead to cracks forming in a corner in one of the slots. Once a crack forms, it typically propagates outwardly completely through the clip and the reinforcing ring 302, causing the screen media to undesirably prematurely fail.

Figure 37:
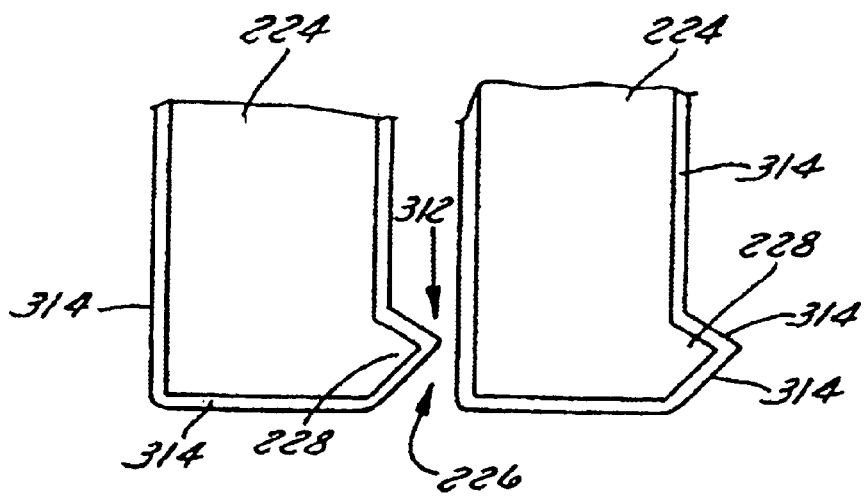
FIG. 37 depicts a fragmentary end elevation view of a preferred embodiment of a plurality of wires of a wedgewire screen media depicting a preferred coating arrangement.

Referring to FIGS. 37 and 38, in a preferred method of making a wedgewire screen media of this invention, each wire 224 is individually coated preferably by ensuring that each wire 224 is spaced apart from every other wire 224 by at least two thousandths of an inch such that a liquid coating can wet the surface of each wire 224 that is exposed toward stock before it passes through the screen media (e.g., inlet or accepts side) as well as at least a portion of the wire 224 downstream of the throat 312. In one preferred implementation, a coating 314 wets the entire surface of each wire 224. As a result of the coating 314 extending downstream of the throat 312, wear downstream of the throat 312 is substantially reduced and preferably substantially completely prevented. Preferably, the coating 314 covers all of the surfaces of ridge 228 thereby helping to prevent undercutting from occurring. As a result, the life of a wedgewire screen media of this invention is dramatically extended.

In one preferred implementation of the method, a plurality of wires 224 are arranged in parallel and spaced apart in a manner like that shown in FIG. 37 or FIG. 38. However, the spacing between adjacent wires 224 is selected to be greater than slot width such that liquid coating material can flow between the wires 224 including downstream of throat 312. In one preferred implementation, the liquid coating material is chrome 314. However other liquid coating materials can be used. For example, the liquid coating 314 can be a nickel-plating material, a titanium nitriding material, a diamond coating, or another liquid coating used to reduce screen media wear.

Referring more particularly to FIG. 38, after coating, the wires 224 are each placed in a wire-receiving slot 316 of retainer clip 230. In one preferred embodiment of the clip 230, each slot 316 has a pair of spaced apart sidewalls or edges 318, 320 that converge toward each other to form a vee. In the preferred clip embodiment shown in FIG. 37, the sidewalls 318, 320 converge to an end wall 322 that has a radius of curvature such that the end wall 322 is rounded. In one preferred implementation, each slot end wall 322 has a radius of curvature of at least ⅛ of an inch to help ensure that stress and flexing during screen operation does not cause the clip 230 to crack along any slot 316. Such a rounded end wall configuration helps prevent stress risers in the region of each slot 316 and helps reduce cracking of the clip.

FIGS. 39–42 illustrate preferred wedgewire screen media wire retainer clip embodiments. FIG. 39 illustrates a clip 230 that has a plurality of wire receiving slots 316 that are each defined by slot edges 318, 320 that converge toward a vee shape forming an acute included angle, α, therebetween of no greater than about 7 degrees. In one preferred embodiment, the edges 318, 320 form an acute included angle of about 4 degrees such that the clip 230 firmly clamps wires 224 received in the slots 316 when the clip 230 and wires 224 are formed into a curved panel or cylinder. Each corner 324, 326 where end wall 322 and edges 318, 320 is curved to minimize and preferably prevent stress risers in each slot. In a preferred embodiment, the radius of curvature of each corner 324, 326 is at least 0.5 millimeter and preferably about 0.55 millimeter for a slot that is between 7 and 8 millimeters deep.

The clip 230 shown in FIG. 40 is similar in construction to the clip shown in FIG. 30 except that the radiused corners 324, 326 converge such that their radii blend. Preferably, the radius of each corner 324, 326 is at least about 1.25 millimeter and preferably about 1.5 millimeter.

The clip 230 shown in FIG. 41 is also similar except that its end wall 322 is elliptically shaped. End wall 322 shown in FIG. 41 forms part of an ellipse having a width across the slot 316 of at least about 1 millimeter and a half-width transverse to the slot of at least about 0.5 millimeter. In one preferred embodiment, the slot width adjacent the end wall where it begins to curve is about 1.19 millimeters and the half-width in a direction transverse to the slot is about 0.95 millimeter.

FIG. 42 illustrates a preferred clip cross section. The clip 230 is generally U-shaped and has a pair of arms 238, 240 that both have a cross sectional thickness greater than that of the end wall 236. As a result, the clip 230 is stronger and better able to withstand cyclic stresses encountered during screening operation without requiring any welded reinforcement ring. Such a clip configuration is particularly well suited for use in an interlocking wedgewire screen media and frame assembly of this invention.

In a preferred method of making clip 230, each clip 230 is machined to form such vee shaped clip slots 316. Additionally, the clip slots 316 are machined to more accurately space them apart to provide the desired pitch and width of the screening slots 226. As a result of machining the clip slots 316 to impart to each slot 316 a rounded end wall 322, cracking of the clip 230 is minimized such that it preferably is prevented.

After placing each wire 224 in a slot 316 of clip 230, pin 235 is inserted through bores 234 to secure the wires 224 to the clip 230. After all of the wires 224 are assembled to clips 230 in this manner, a rectangular screen media panel (not shown) is formed. Thereafter, the screen media panel is rolled to impart a radius of curvature to it such that it forms at least part of a tube that preferably is generally cylindrical. Preferably, the panel is rolled into a hoop that preferably is cylindrical where the wedgewire screen media is intended to be formed of a single panel.

Where a plurality of clips 230 are equipped with engaging structure, such as engaging structure 180, formed screen media 66 is inserted into a frame 68 with the engaging structure of the screen media 66 engaged with the engaging structure of the frame 68. If needed, a hammer or another suitable tool can be used to pound one edge of the screen media 66 to urge it farther into the frame 68. As a result of clip 230 not being welded or otherwise bonded to wires 224, the frame 68, a reinforcing ring, or any other component, the likelihood of the clip 230 cracking during screen operation is reduced, which increases the life of the screen media 66. Additionally, because the clip 230 is not welded to the frame 68, the likelihood of localized stress build up in the screen media 66 is reduced if not completely prevented. This produces a screen media 66 and screen cylinder 64 of robust, resilient, strong, tough, and economical construction.

It is also to be understood that, although the foregoing description and drawings describe and illustrate in detail one or more preferred embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims.

What is claimed is:

1. A pulp screening apparatus comprising:
    a housing having an inlet and an outlet;
    a screen cylinder assembly received in the housing that includes a perforate cylindrical frame and a perforate screen media that releasably interlocks with the perforate cylindrical frame wherein the perforate screen media releasably interlocks with the perforate cylindrical frame using a hook and lip arrangement; and
    wherein the hook and lip arrangement comprises a plurality of axially spaced apart hooks carried by the screen media and a plurality of axially spaced apart lips carried by the frame that releasably engage one of the hooks when the screen media is releasably assembled to the frame.

2. A screen cylinder for a pulp screening apparatus comprising:
    a perforate frame and a perforate screen media that releasably interlocks with the perforate frame; and
    wherein the perforate screen media comprises a wedgewire screen that has a plurality of pairs of longitudinally extending wires carried by a transversely extending clip that has a hook, the frame further comprises a lip, and the hook engages the lip when the wedgewire screen is assembled to the frame releasably interlocking the wedgewire screen to the frame.

3. A screen cylinder for a pulp screening apparatus comprising:
    a perforate cylindrical frame and a perforate screen media that releasably interlocks with the perforate cylindrical frame;
    wherein the perforate screen media comprises a wedgewire screen that has a plurality of pairs of axially extending wires carried by a transversely extending clip that has a hook, the frame further comprises a lip, and the hook engages the lip when the wedgewire screen is assembled to the frame releasably interlocking the wedgewire screen to the frame; and
    wherein the lip of the frame is formed by a channel in a peripheral surface of the frame.

4. A screen cylinder for a pulp screening apparatus comprising:
    a perforate cylindrical frame and a perforate screen media that releasably interlocks with the perforate cylindrical frame;
    wherein the perforate screen media comprises a wedgewire screen that has a plurality of pairs of axially extending wires carried by a transversely extending clip that has a hook, the frame further comprises a lip, and the hook engages the lip when the wedgewire screen is assembled to the frame releasably interlocking the wedgewire screen to the frame; and
    wherein the wedgewire screen has a plurality of the transversely extending clips that each bound the wires with at least one of the clips having an arm with a plurality of wire-receiving slots and the hook extending generally transversely therefrom.

5. A screen cylinder for a pulp screening apparatus comprising:
    a perforate frame and a perforate screen media that releasably interlocks with the perforate frame;
    wherein the perforate screen media comprises a wedgewire screen and further comprising a plurality of spaced apart radial movement restraining joints between the wedgewire screen and the frame that each oppose movement of the wedgewire screen in a direction generally transverse relative to the frame away from the frame and that each releasably attach the wedgewire screen to the frame without any bond; and
    wherein each radial movement restraining joint comprises a hook carried by the wedgewire screen that engages a lip carried by the frame.

6. A screen cylinder for a pulp screening apparatus according to claim 5 wherein the hook of each radial movement restraining joint extends outwardly and in an axial direction from the wedgewire screen and the lip of each radial movement restraining joint is defined by a channel formed in an inner peripheral surface of the frame.

7. A screen cylinder for a pulp screening apparatus comprising:
    a perforate tubular frame and a perforate screen media that releasably interlocks with the frame; and
    wherein the screen media comprises a wedgewire screen that has a plurality of pairs of slats retained and spaced apart by a plurality of pairs of transversely extending slotted retainer clips with at least one of the retainer clips releasably interlocking with the frame and another one of the retainer clips bearing against a peripheral surface of the frame without releasably interlocking with the frame.

8. A screen cylinder for a pulp screening apparatus according to claim 7 wherein no reinforcement ring is welded to any retainer clip.

9. A screen cylinder for a pulp screening apparatus comprising:
a perforate tubular frame and a perforate screen media that releasably interlocks with the frame; and
wherein the frame has a sidewall with a plurality of polygonal shaped windows therethrough with each one of the plurality of polygonal shaped windows being defined by a pair of adjacent sides that form an acute included angle therebetween.

10. A screen cylinder for a pulp screening apparatus comprising:
a perforate cylindrical frame and a perforate screen media that releasably interlocks with the perforate cylindrical frame wherein the perforate cylindrical frame has a sidewall with a plurality of polygonal shaped windows therethrough with each one of the plurality of polygonal shaped windows being defined by a pair of adjacent sides that form an acute included angle therebetween; and
wherein each one of the plurality of polygonal shaped Windows is triangularly shaped and arranged in pairs of adjacent triangularly shaped windows with one triangularly shaped window of each adjacent pair having an apex pointing in one direction and the other triangularly shaped window of each adjacent pair pointing in an opposite direction.

11. A screen cylinder for a pulp screening apparatus according to claim 10 wherein the plurality of polygonal shaped windows are arranged in a plurality of circumferentially extending rows and axially extending columns of polygonal shaped windows.

12. A screen cylinder for a pulp screening apparatus according to claim 11 wherein the plurality of triangularly shaped windows are arranged in a plurality of pairs of rows that each have a plurality of pairs of triangularly shaped windows with each triangularly shaped window of each row having an apex disposed adjacent the base of an adjacent triangularly shaped window in one adjacent row and having a base disposed adjacent the apex of an adjacent triangularly shaped window in another adjacent row.

13. A screen cylinder for a pulp screening apparatus according to claim 10 wherein the plurality of triangularly shaped windows are arranged in a plurality of pairs of rows that each have a plurality of pairs of triangularly shaped windows with each triangularly shaped window of each row having a base disposed adjacent the base of an adjacent triangularly shaped window in one adjacent row and having an apex disposed adjacent the apex of an adjacent triangularly shaped window in another adjacent row.

14. A screen cylinder for a pulp screening apparatus comprising:
a perforate tubular frame and a perforate screen media that releasably interlocks with the perforate tubular frame, wherein the perforate tubular frame is comprised of a hexagonal truss arrangement.

15. A screen cylinder for a pulp screening apparatus according to claim 14 wherein the hexagonal truss arrangement comprises a plurality of hexagonal truss sections.

16. A screen cylinder for a pulp screening apparatus according to claim 14 wherein each hexagonal truss section is comprised of six generally triangular flow windows with each pair of adjacent flow windows spaced apart by a strut.

17. A screen cylinder for a pulp screening apparatus comprising:
a perforate cylindrical frame and a perforate screen media that releasably interlocks with the perforate cylindrical frame wherein the perforate cylindrical frame is comprised of a hexagonal truss arrangement; and
wherein each hexagonal truss sections comprises a hub having six struts radiating outwardly therefrom with each strut spaced apart from an adjacent strut by a triangular flow window that extends through the frame.

18. A screen media for a pulp screen apparatus comprising:
(a) a plurality of pairs of wires;
(b) a wire retainer clip that has a body with an end wall having a first cross-sectional thickness, an arm extending outwardly from the end wall having a second cross-sectional thickness that is greater than the first cross-sectional thickness, and a plurality of wire receiving slots formed in the arm that each have an end with a radius of curvature; and
(c) a pin extending through the plurality of pairs of wires.

19. A screen media according to claim 18 further comprising a hook that extends outwardly from the arm that is capable of releasably engaging a frame of the pulp screening apparatus.

20. A screen cylinder for a pulp screening apparatus comprising:
a cylindrical perforate frame;
a perforate screen media;
a plurality of spaced apart engaging structures that releasably interlock the screen media to the frame at a plurality of spaced apart locations that each oppose displacement of the screen media away from the frame during screening apparatus operation; and
wherein each one of the engaging structures comprises a hook carried by the screen media and a lip carried by the frame.

21. A screen cylinder for a pulp screening apparatus comprising:
(a) a cylindrical perforate frame having a plurality of hexagonal trusses and a plurality of spaced apart engaging structures disposed on an inner peripheral surface of the frame;
(b) a perforate cylindrical wedgewire screen media having a plurality of pairs of wires retained by a plurality of spaced apart slotted retainer clips with each one of the clips having an engaging structure; and
(c) wherein each one of the plurality of engaging structures of the frame releasably interlock with a respective one of the plurality of engaging structures of one of the retainer clips.

22. A screen cylinder for a pulp screening apparatus comprising:
(a) a cylindrical perforate frame having a plurality of pairs of flow windows and a plurality of axially spaced apart and circumferentially extending lips carried by an inner peripheral surface of the frame;
(b) a perforate cylindrical wedgewire screen media having a plurality of pairs of wires retained by a plurality of spaced apart slotted retainer clips with each one of the plurality of clips having a hook extending therefrom and each pair of adjacent wires defining a screening slot therebetween; and
(c) wherein each one of the hooks engages a respective one of the lips when the screen media is assembled to the frame.

23. A screen cylinder according to claim 22 wherein each lip extends continuously circumferentially about the entire circumference of the inner peripheral surface of the frame.

24. A screen cylinder according to claim 23 wherein each hook extends continuously circumferentially about the entire circumference of an outer peripheral surface of the wedgewire screen media.

25. A screen cylinder for a pulp screening apparatus according to claim 22 wherein the perforate cylindrical wedgewire screen media is comprised of a plurality of perforate wedgewire screen media panels that each flex to conform to the contour of the frame when assembled to the frame.

26. A screen cylinder for a pulp screening apparatus comprising:
    (a) a cylindrical perforate frame having a plurality of flow windows and a plurality of spaced apart engaging structures disposed on an inner peripheral surface of the frame;
    (b) a perforate wedgewire screen media having a plurality of pairs of wires retained by a plurality of spaced apart slotted retainer clips with each one of the clips having a hook; and
    (c) wherein each one of the plurality of engaging structures of the frame releasably interlock with the hook of one of the retainer clips.

27. A screen cylinder for a pulp screening apparatus comprising:
    (a) a cylindrical perforate frame having a plurality of adjacent pairs of generally triangularly shaped flow windows with one triangularly shaped window of each adjacent pair having an apex pointing in one direction and the other triangularly shaped window of each adjacent pair pointing in an opposite direction;
    (b) a perforate wedgewire screen media having a plurality of pairs of parallel wires retained by a plurality of spaced apart slotted retainer clips; and
    (c) wherein the perforate wedgewire screen media is releasably supported by the frame.

28. A screen media for a pulp screen apparatus comprising:
    a plurality of pairs of wires;
    a wire retainer clip that has a body with an end wall having a first cross-sectional thickness, an arm extending outwardly from the end wall having a second cross-sectional thickness that is greater than the first cross-sectional thickness, and a plurality of wire receiving slots formed in the arm that each have an end with a radius of curvature and that each receive one of the wires, and a hook that extends outwardly from the arm that is capable of releasably engaging a frame of the pulp screening apparatus; and
    a pin extending through the plurality of pairs of wires.

29. A screen cylinder for a pulp screening apparatus comprising:
    a cylindrical frame defined by a sidewall of one-piece and unitary construction, the sidewall having a plurality of pairs of flow windows formed therein that each extend completely therethrough, the sidewall having an inner surface with a plurality of pairs of axially spaced apart lips, each of which extends circumferentially around the inner surface of the sidewall;
    a perforate screen media having a plurality of axially extending screening slots through which stock flows during pulp screening apparatus operation and having a plurality of pairs of spaced apart hooks, each of which engages a respective one of the lips of the sidewall of the frame when the screen media is disposed in the frame; and
    wherein stock flows during pulp screening apparatus operation through at least one of the screening slots in the screen media before passing through at least one of the flow windows in the frame.

30. A screen cylinder for a pulp screening apparatus comprising:
    a cylindrical frame defined by an endless sidewall of one-piece and, unitary construction and surrounding a vertical axis, the sidewall having a plurality of pairs of flow windows formed therein that each extend completely therethrough, the sidewall having an inner surface with a plurality of axially spaced apart and upturned lips; and
    a perforate screen media having a plurality of axially extending screening slots through which stock flows during operation and having a plurality of spaced apart and downturned hooks, each of which engages a respective one of the upturned lips of the sidewall of the frame when the screen media is disposed in the frame.

31. A screen cylinder for a pulp screening apparatus comprising:
    a cylindrical frame defined by a sidewall of one-piece and unitary construction, the sidewall having a plurality of flow windows formed therein that each extend completely therethrough, the sidewall having an inner surface and a plurality of axially spaced apart lips integrally formed of the sidewall that each extend axially in one direction; and
    a perforate wedgewire screen media comprised of a plurality of flexible wedgewire screen media panels that each have a plurality of axially extending screening slots through which stock flows during pulp screening apparatus operation and that each have a plurality of spaced apart hooks that extend axially in a direction opposite the lips of the of the sidewall of the frame and that each engage a respective one of the axially extending lips of the sidewall of the frame when the screen media panels are received in the frame.

32. A screen cylinder for a pulp screening apparatus comprising:
    a cylindrical frame defined by an endless sidewall of one-piece and unitary construction, the sidewall having a plurality of radially extending flow windows formed therein that each extend completely through the sidewall, the sidewall having an inner surface and a plurality of axially spaced apart lips adjacent the inner surface that are each integrally formed of the sidewall;
    a perforate wedgewire screen media comprised of a plurality of flexible wedgewire screen media panels that each have a plurality of adjacent pairs of axially extending wires fixed in a plurality of generally U-shaped retainer clips that each have a plurality of pairs of wire-receiving slots therein and a pair of arms, one of which has a hook projecting therefrom that releasably engages with and overlaps a respective one of the lips of the sidewall of the frame when the screen media panels are received in the frame; and
    wherein each adjacent pair of wires are spaced apart by the refiner clips defining axially extending screening slots therebetween through which stock flows during pulp screening apparatus operation before the stock flows through at least one of the flow windows in the frame.

* * * * *